(12) United States Patent
Huynh

(10) Patent No.: US 9,774,406 B2
(45) Date of Patent: Sep. 26, 2017

(54) SYSTEM AND METHOD FOR TESTING RADIO FREQUENCY WIRELESS SIGNAL TRANSCEIVERS USING WIRELESS TEST SIGNALS

(71) Applicant: LITEPOINT CORPORATION, Sunnyvale, CA (US)

(72) Inventor: Minh-Chau Huynh, San Mateo, CA (US)

(73) Assignee: LitePoint Corporation, Sunnyvale, CA (US)

( * ) Notice: Subject to any disclaimer, the term of this patent is extended or adjusted under 35 U.S.C. 154(b) by 216 days.

(21) Appl. No.: 13/912,423

(22) Filed: Jun. 7, 2013

(65) Prior Publication Data

US 2014/0273873 A1  Sep. 18, 2014

Related U.S. Application Data

(63) Continuation-in-part of application No. 13/839,162, filed on Mar. 15, 2013, and a continuation-in-part of application No. 13/839,583, filed on Mar. 15, 2013.

(51) Int. Cl.
*H04B 17/00* (2015.01)
*H04B 17/29* (2015.01)

(52) U.S. Cl.
CPC .......... *H04B 17/008* (2013.01); *H04B 17/29* (2015.01)

(58) Field of Classification Search
CPC ....... H04B 17/00; H04B 17/008; G01R 29/10
(Continued)

(56) References Cited

U.S. PATENT DOCUMENTS 6,657,214 B1   12/2003  Foegelle et al.
7,599,618 B2   10/2009  Adam et al.
(Continued)

FOREIGN PATENT DOCUMENTS

CN   101056149 A   10/2007
CN   101107533 A   1/2008
(Continued)

OTHER PUBLICATIONS

International Search Report and Written Opinion in PCT/US2014/038351 dated Sep. 26, 2014, 10 pgs.
(Continued)

*Primary Examiner* — Graham Smith
*Assistant Examiner* — Noel Maldonado
(74) *Attorney, Agent, or Firm* — Banner & Witcoff, Ltd.

(57) ABSTRACT

A system and method for facilitating wireless testing of a radio frequency (RF) signal transceiver device under test (DUT). Using multiple antennas within a shielded enclosure containing the DUT, multiple wireless RF test signals resulting from a RF test signal radiated from the DUT can be captured and have their respective signal phases controlled in accordance with one or more signal characteristics, including their respective signal power levels, their respective signal phases as received, and a signal power level of a combination of the received signals. Such phase control of the captured wireless RF test signals can be performed individually for any DUT tested within the shielded enclosure, thereby providing compensation for the multipath signal environment within the shielded enclosure irrespective of the placement of the DUT, and thereby simulating a wired test signal path during wireless testing of the DUT.

18 Claims, 21 Drawing Sheets

(58) Field of Classification Search
USPC .................................... 455/67.12; 343/703
See application file for complete search history.

(56) References Cited

U.S. PATENT DOCUMENTS

| | | | |
|---|---|---|---|
| 8,138,778 | B1 | 3/2012 | Smith |
| 9,002,287 | B2* | 4/2015 | Mow et al. ............... 455/67.12 |
| 2003/0003883 | A1 | 1/2003 | Wallace et al. |
| 2006/0146318 | A1 | 7/2006 | Adam et al. |
| 2007/0201577 | A1 | 8/2007 | Vasil'Evich et al. |
| 2007/0243826 | A1 | 10/2007 | Liu |
| 2007/0285109 | A1 | 12/2007 | Niayesh et al. |
| 2008/0144707 | A1 | 6/2008 | Tsfati et al. |
| 2008/0150792 | A1 | 6/2008 | Stayton et al. |
| 2010/0285753 | A1 | 11/2010 | Foegelle |
| 2010/0308856 | A1 | 12/2010 | Watanabe et al. |
| 2011/0084887 | A1* | 4/2011 | Mow et al. ................. 343/703 |
| 2012/0100813 | A1 | 4/2012 | Mow et al. |
| 2012/0274345 | A1 | 11/2012 | Chen et al. |
| 2012/0275506 | A1 | 11/2012 | Ding et al. |
| 2013/0027256 | A1 | 1/2013 | Guo et al. |

FOREIGN PATENT DOCUMENTS

| | | |
|---|---|---|
| CN | 101192864 A | 6/2008 |
| CN | 102761378 A | 10/2012 |
| WO | 2008136301 A1 | 11/2008 |

OTHER PUBLICATIONS

International Preliminary Report on Patentability filed in PCT/US2014/019865; dated Sep. 15, 2015; 11 pages.
International Preliminary Report on Patentability filed in PCT/US2014/019912; dated Sep. 15, 2015; 10 pages.
International Preliminary Report on Patentability filed in PCT/US2014/038351 dated Dec. 8, 2015; 7 pgs.
International Preliminary Report on Patentability filed in PCT/US2014/038372 dated Dec. 8, 2015; 11 pgs.
International Search Report and Written Opinion filed in PCT/US2014/019865 dated Jul. 18, 2014; 14 pgs.
May 22, 2017—(TW) Office Action—App 103108352—Eng Tran.
Jun. 19, 2017—(CN) Office Action—App 201480007329.9—Eng Tran.
Jun. 16, 2017—(CN) Office Action—App 201480031895.3—Eng Tran.
Jun. 2, 2017—(CN) Office Action—App 201480032129.9—Eng Tran.
International Search Report and Written Opinion in PCT/US2014/038372 dated Sep. 23, 2014, 14 pages.
U.S. Appl. No. 13/839,162, filed Mar. 15, 2013 Titled "System and Method for Testing Radio Frequency Wireless Signal Transceivers Using Wireless Test Signals".
U.S. Appl. No. 13/912,410, filed Jun. 7, 2013 Titled "System and Method for Testing Radio Frequency Wireless Signal Transceivers Using Wireless Test Signals".
U.S. Appl. No. 13/912,416, filed Jun. 7, 2013 Titled "System and Method for Testing Radio Frequency Wireless Signal Transceivers Using Wireless Test Signals".
U.S. Appl. No. 13/839,583, filed Mar. 15, 2013 Titled "System and Method for Testing Radio Frequency Wireless Signal Transceivers Using Wireless Test Signals".
International Search Report and Written Opinion in PCT/US2014/038338 dated Sep. 23, 2014, 10 pgs.
International Search Report and Written Opinion in PCT/US2014/038372 dated Sep. 23, 2014, 14 pgs.

* cited by examiner

SYSTEM AND METHOD FOR TESTING RADIO FREQUENCY WIRELESS SIGNAL TRANSCEIVERS USING WIRELESS TEST SIGNALS

RELATED APPLICATIONS

This application is a continuation-in-part of U.S. patent application Ser. No. 13/839,162, filed Mar. 15, 2013, and entitled "System and Method for Testing Radio Frequency Wireless Signal Transceivers Using Wireless Test Signals", and a continuation-in-part of U.S. patent application Ser. No. 13/839,583, filed Mar. 15, 2013, and entitled "System and Method for Testing Radio Frequency Wireless Signal Transceivers Using Wireless Test Signals", the contents of both of which are incorporated herein by reference.

BACKGROUND

The present invention relates to testing of radio frequency (RF) wireless signal transceivers, and in particular, to testing such devices without a need for RF signal cables for conveyance of RF test signals.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems ("testers") employ a subsystem for analyzing signals received from each device. Such subsystems typically include at least a vector signal generator (VSG) for providing the source signals to be transmitted to the device, and a vector signal analyzer (VSA) for analyzing signals produced by the device. The production of test signals by the VSG and signal analyses performed by the VSA are generally programmable so as to allow each to be used for testing a variety of devices for adherence to a variety of wireless technology standards with differing frequency ranges, bandwidths and signal modulation characteristics.

Calibration and performance verification testing of a device under test (DUT) are typically done using electrically conductive signal paths, such as RF cables, rather than wireless signal paths, by which a DUT and tester communicate via electromagnetic radiation. Accordingly, the signals between the tester and DUT are conveyed via the conductive signal path rather than being radiated through ambient space. Using such conductive signal paths helps to ensure repeatability and consistency of measurements, and eliminates positioning and orientation of the DUT as a factor in signal conveyance (transmission and reception).

In the case of a multiple input, multiple output (MIMO) DUT, a signal path must be provided, in some form, for each input/output connection of the DUT. For example, for a MIMO device intended to operate with three antennas, three conductive signal paths, e.g., cables and connections, must be provided for testing.

However, using conductive signal paths significantly impacts the time needed for testing each DUT due to the need for physically connecting and disconnecting the cables between the DUT and tester. Further, in the case of a MIMO DUT, multiple such connecting and disconnecting actions must be performed, both at the beginning and termination of testing. Further, since the signals being conveyed during testing are not radiated via the ambient space, as they would be in the normally intended use, and the antenna assemblies for the DUT are not in use during such testing, such testing does not simulate real world operation and any performance characteristics attributable to the antennas are not reflected in the test results.

As an alternative, testing could be done using test signals conveyed via electromagnetic radiation rather than electrical conduction via cables. This would have the benefit of requiring no connecting and disconnecting of test cables, thereby reducing the test time associated with such connections and disconnections. However, the "channel" in which the radiated signals and receiver antennas exist, i.e., the ambient space through which the test signals are radiated and received, is inherently prone to signal interference and errors due to other electromagnetic signals originating elsewhere and permeating the ambient space. Such signals will be received by the DUT antennas and can include multipath signals from each interfering signal source due to signal reflections. Accordingly, the "condition" of the "channel" will typically be poor compared to using individual conductive signal paths, e.g., cables, for each antenna connection.

One way to prevent, or at least significantly reduce, interference from such extraneous signals, is to isolate the radiated signal interface for the DUT and tester using a shielded enclosure. However, such enclosures have typically not produced comparable measurement accuracy and repeatability. This is particularly true for enclosures that are smaller than the smallest anechoic chambers. Additionally, such enclosures tend to be sensitive to the positioning and orientation of the DUT, as well as to constructive and destructive interference of multipath signals produced within such enclosures.

Accordingly, it would be desirable to have systems and methods for testing wireless signal transceivers, and particularly wireless MIMO signal transceivers, in which radiated electromagnetic test signals can be used, thereby simulating real world system operation as well as avoiding test time otherwise necessary for connecting and disconnecting test cabling, while maintaining test repeatability and accuracy by avoiding interfering signals due to externally generated signals and multipath signal effects.

SUMMARY

In accordance with the presently claimed invention, a system and a method provide for facilitating wireless testing of a radio frequency (RF) signal transceiver device under test (DUT). Using multiple antennas within a shielded enclosure containing the DUT, multiple wireless RF test signals resulting from a RF test signal radiated from the DUT can be captured and have their respective signal phases controlled in accordance with one or more signal characteristics, including their respective signal power levels, their respective signal phases as received, and a signal power level of a combination of the received signals. Such phase control of the captured wireless RF test signals can be performed individually for any DUT tested within the shielded enclosure, thereby providing compensation for the multipath signal environment within the shielded enclosure irrespective of the placement of the DUT, and thereby simulating a wired test signal path during wireless testing of the DUT.

In accordance with one embodiment of the presently claimed invention, a system to facilitate wireless testing of a radio frequency (RF) signal transceiver device under test (DUT) includes:

a structure defining interior and exterior regions and configured to allow placement of a DUT within the interior region and to be substantially isolated from electromagnetic radiation originating from the exterior region;

a plurality of antennas disposed at least partially within the interior region to receive at least one plurality of wireless RF test signals related to a common RF test signal radiated from the DUT; and RF signal control circuitry coupled to the plurality of antennas and responsive to the at least one plurality of wireless RF test signals by controlling, in accordance with one or more phase control signals, respective phases of at least a portion of the at least one plurality of wireless RF test signals to provide at least one plurality of phase-controlled RF test signals, and measuring and combining the at least one plurality of phase-controlled RF test signals to provide the one or more phase control signals and a RF output signal related to a combination of the at least one plurality of phase-controlled RF test signals.

In accordance with another embodiment of the presently claimed invention, a method of facilitating wireless testing of a radio frequency (RF) signal transceiver device under test (DUT) includes:

providing a structure defining interior and exterior regions and configured to allow placement of a DUT within the interior region and to be substantially isolated from electromagnetic radiation originating from the exterior region;

providing a plurality of antennas disposed at least partially within the interior region to receive at least one plurality of wireless RF test signals related to a common RF test signal radiated from the DUT; and responding to the at least one plurality of wireless RF test signals by controlling, in accordance with one or more phase control signals, respective phases of at least a portion of the at least one plurality of wireless RF test signals to provide at least one plurality of phase-controlled RF test signals, and measuring and combining the at least one plurality of phase-controlled RF test signals to provide the one or more phase control signals and a RF output signal related to a combination of the at least one plurality of phase-controlled RF test signals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Figure 1:
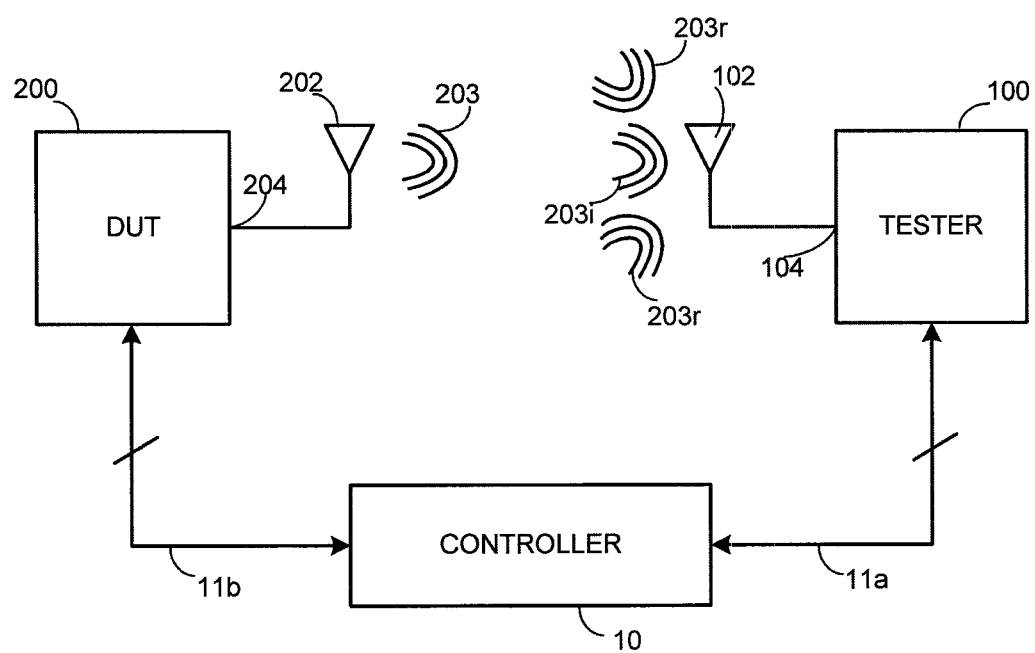
FIG. 1 depicts a typical operating and possible testing environment for a wireless signal transceiver.

Referring to FIG. 1, a typical operating environment, and ideal testing environment for a wireless signal transceiver (at least in terms of simulating real world operation), would have the tester 100 and DUT 200 communicate wirelessly. Typically, some form of test controller 10, (e.g., a personal computer) will also be used to exchange testing commands and data via wired signal interfaces 11a, 11b with the tester 100 and DUT 200. The tester 100 and DUT 200 each have one (or more for MIMO devices) respective antennas 102, 202, which connect by way of conductive signal connectors 104, 204 (e.g., coaxial cable connections, many types of which are well known in the art). Test signals (source and response) are conveyed wirelessly between the tester 100 and DUT 200 via the antennas 102, 202. For example, during a transmit (TX) test of the DUT 200, electromagnetic signals 203 are radiated from the DUT antenna 202. Depending upon the directivity of the antenna emission pattern, this signal 203 will radiate in numerous directions, resulting in an incident signal component 203i and reflected signal components 203r being received by the tester antenna 102. As discussed above, these reflected signal components 203r, often the products of multipath signal effects as well as other electromagnetic signals originating elsewhere (not shown), result in constructive and destructive signal interference, thereby preventing reliable and repeatable signal reception and testing results.

Figure 2:
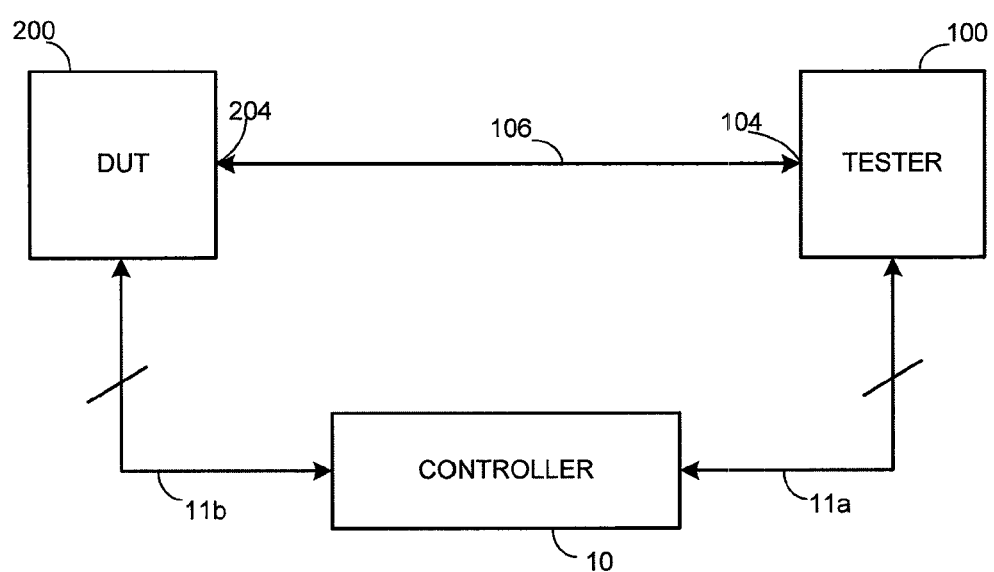
FIG. 2 depicts a testing environment for a wireless signal transceiver using a conductive test signal path.

Referring to FIG. 2, to avoid such unreliable testing results, a conductive signal path, such as a RF coaxial cable 106, is used to connect the antenna connectors 104, 204 of the tester 100 and DUT 200 to provide a consistent, reliable and repeatable electrically conductive signal path for conveyance of the test signals between the tester 100 and DUT 200. As discussed above, however, this increases the overall test time due to the time needed for connecting and disconnecting the cable 106 before and after testing.

Figure 3:
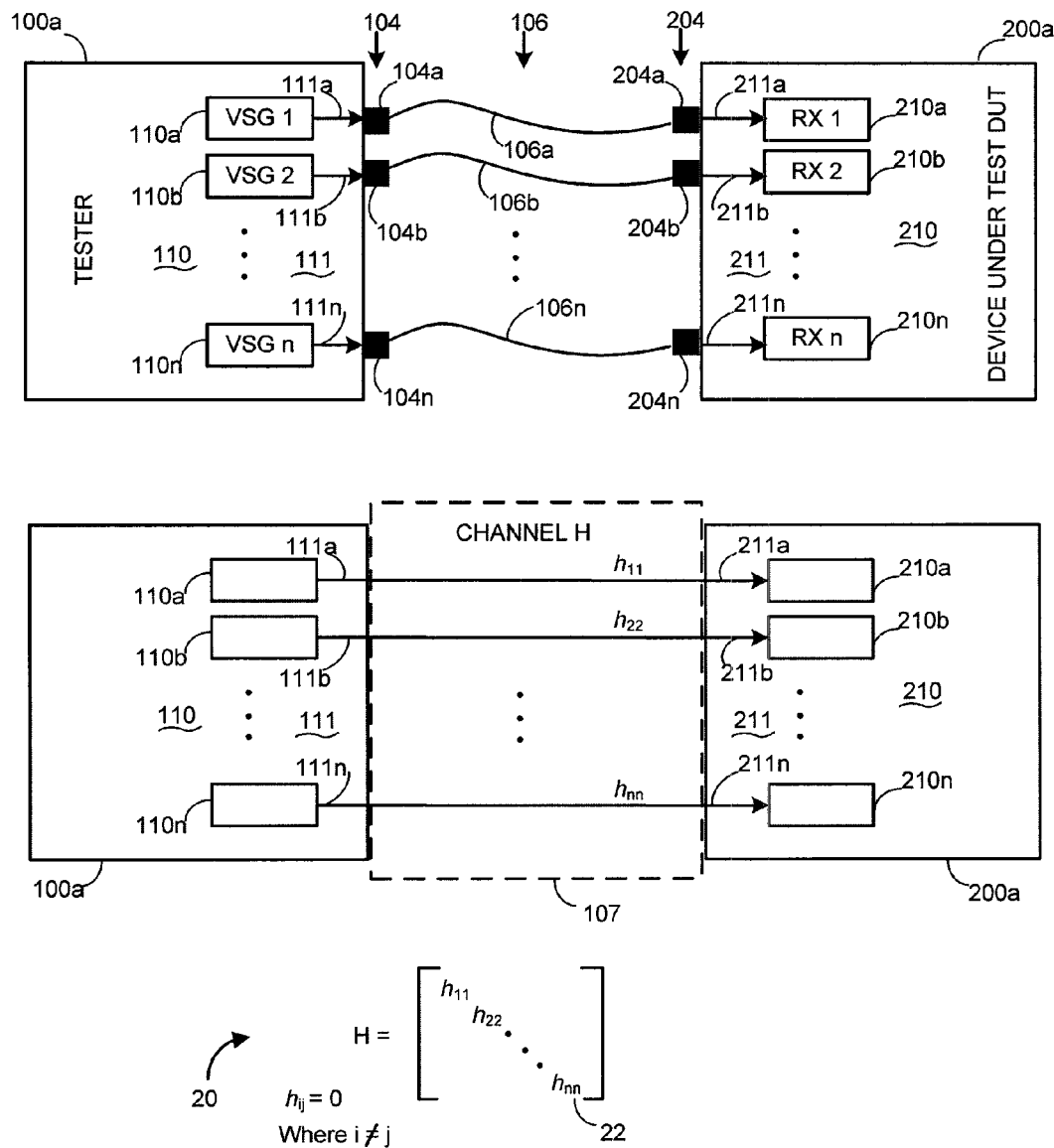
FIG. 3 depicts a testing environment for a MIMO wireless signal transceiver using conductive signal paths and a channel model for such testing environment.

Referring to FIG. 3, the additional test time for connecting and disconnecting test cabling becomes even longer when testing a MIMO DUT 200a. In such cases, multiple test cables 106 are needed to connect corresponding tester 104 and DUT 204 connectors to enable conveyance of the RF test signals from the RF signal sources 110 (e.g., VSGs) within the tester 100a for reception by the RF signal receivers 210 within the DUT 200a. For example, in a typical testing environment, the tester for testing MIMO devices will have one or more VSGs 110a, 110b, 110n providing corresponding one or more RF test signals 111a, 111b, . . . , 111n (e.g., packet data signals having variable signal power, packet contents and data rates). Their corresponding test cables 106a, 106b, . . . , 106n, connected via respective tester 104a, 104b, 104n and DUT 204a, 204b, . . . , 204n connectors, convey these signals to provide the received RF test signals 211a, 211b, . . . , 211n for the corresponding RF signal receivers 210a, 210b, . . . , 210n within the DUT 200a. Accordingly, the additional test time required for connecting and disconnecting these test cables 106 can be increased by a factor n corresponding to the number of test cables 106.

As discussed above, using test cables for connecting the tester 100a and DUT 200a does have the advantage of providing consistent, reliable, and repeatable test connections. As is well known in the art, these test connections 107 can be modeled as a signal channel H characterized by a diagonal matrix 20, where the diagonal matrix elements 22 correspond to the direct-coupled coefficients $h_{11}$, $h_{22}$, . . . , $h_{nn}$ ($h_{ij}$, where i=j) for the respective signal channel characteristics (e.g., signal path conductivities or losses for the respective test cables 106).

Figure 4:
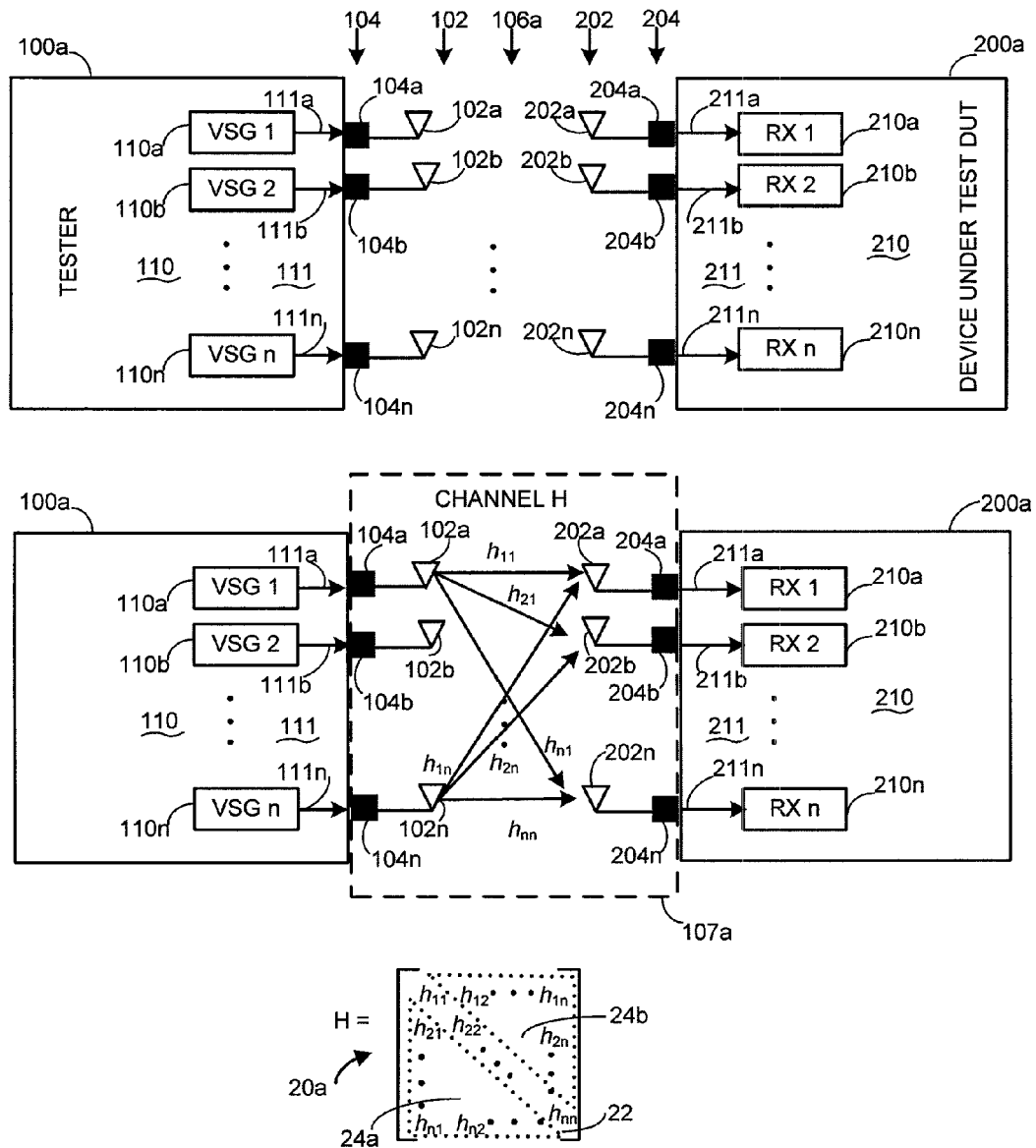
FIG. 4 depicts a testing environment for a MIMO wireless signal transceiver using radiated electromagnetic signals a channel model for such testing environment.

Referring to FIG. 4, in accordance with one or more exemplary embodiments, the conductive, or wired, channel 107 (FIG. 3) is replaced by a wireless channel 107a corresponding to a wireless signal interface 106a between the tester 100a and DUT 200a. As discussed above, the tester 100a and DUT 200a communicate test signals 111, 211 via respective arrays of antennas 102, 202. In this type of test environment, the signal channel 107a is no longer represented by a diagonal matrix 20, but is instead represented by a matrix 20a having one or more non-zero cross-coupled coefficients 24a, 24b ($h_{ij}$, where i≠j) off of the diagonal 22. As will be readily understood by one skilled in the art, this is due to the multiple wireless signal paths available in the channel 107a. For example, unlike a cabled signal environment in which, ideally, each DUT connector 204 receives only the signal from its corresponding tester connector 104. In this wireless channel 107a, the first DUT antenna 202a receives test signals radiated by all of the tester antennas 102a, 102b, . . . , 102n, e.g., corresponding to channel H matrix coefficients $h_{11}$, $h_{12}$, . . . , and $h_{1n}$.

In accordance with well known principles, the coefficients h of the channel matrix H correspond to characteristics of the channel 107a affecting transmission and reception of the RF test signals. Collectively, these coefficients h define the channel condition number k(H), which is the product of the norm of the H matrix and the norm of the inverse of the H matrix, as represented by the following equation:

$$k(H)=\|H\|*\|H^{-1}\|$$

The factors affecting these coefficients can alter the channel condition number in ways that can create measurement errors. For example, in a poorly conditioned channel, small errors can cause large errors in the testing results. Where the channel number is low, small errors in the channel can produce small measurements at the receive (RX) antenna. However, where the channel number is high, small errors in the channel can cause large measurement errors at the receive antenna. This channel condition number k(H) is also sensitive to the physical positioning and orientation of the DUT within its testing environment (e.g., a shielded enclosure) and the orientation of its various antennas 204. Accordingly, even if with no extraneous interfering signals originating elsewhere or arriving via reflections and impinging on the receive antennas 204, the likelihood of repeatable accurate test results will be low.

Figure 5:
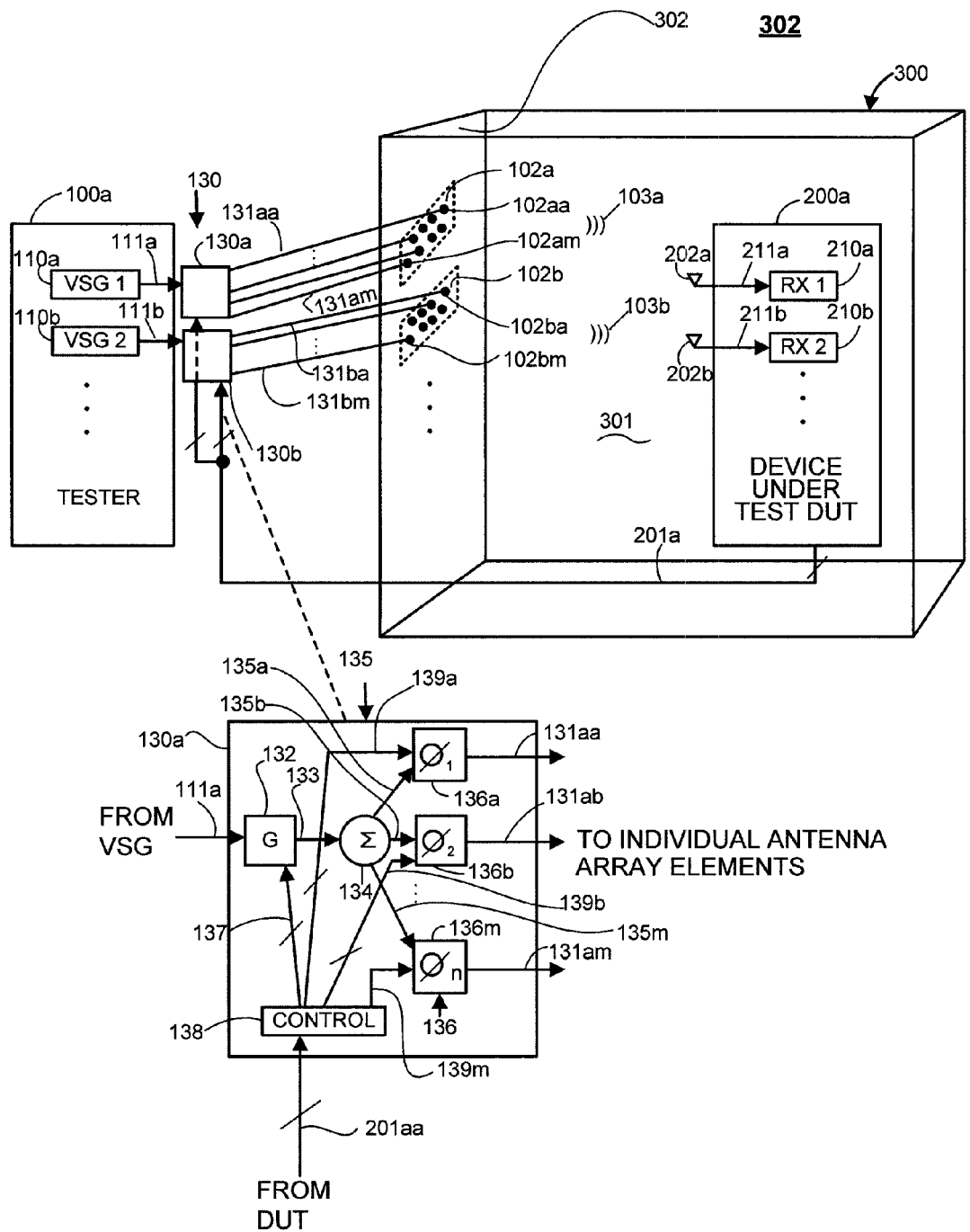
FIG. 5 depicts a testing environment in accordance with exemplary embodiments in which a MIMO DUT can be tested using radiated electromagnetic test signals.

Referring to FIG. 5, in accordance with one or more exemplary embodiments, the test signal interface between the tester 100a and DUT 200a can be wireless. The DUT 200a is placed within the interior 301 of a shielded enclosure 300. Such shielded enclosure 300 can be implemented as a metallic enclosure, e.g., similar in construction or at least in effect to a Faraday cage. This isolates the DUT 200a from radiated signals originating from the exterior region 302 of the enclosure 300. In accordance with exemplary embodiments, the geometry of the enclosure 300 is such that it functions as a closed-ended waveguide.

Elsewhere, e.g., disposed within or on an opposing interior surface 302 of the enclosure 300, are multiple (n) antennas arrays 102a, 102b, . . . , 102n, each of which radiates multiple phase-controlled RF test signals 103a, 103b, . . . , 103n (discussed in more detail below) originating from the test signal sources 110a, 110b, . . . , 110n within the tester 100a. Each antenna array includes multiple (M) antenna elements. For example, the first antenna array 102a includes m antenna elements 102aa, 102ab, . . . 102am. Each of these antenna elements 102aa, 102ab, . . . , 102am is driven by a respective phase-controlled RF test signal 131aa, 131ab, . . . , 131am provided by respective RF signal control circuitry 130a.

As depicted in the example of the first RF signal control circuitry 130a, the RF test signal 111a from the first RF test signal source 110a has its magnitude increased (e.g., amplified) or decreased (e.g., attenuated) by signal magnitude control circuitry 132. The resulting magnitude-controlled test signal 133 is replicated by signal replication circuitry 134 (e.g., a signal divider). The resulting magnitude-controlled, replicated RF test signals 135a, 135b, . . . , 135m have their respective signal phases controlled (e.g., shifted) by respective phase control circuits 136a, 136b, . . . , 136m to produce magnitude- and phase-controlled signals 131aa, 131ab, . . . , 131am to drive the antenna elements 102aa, 102ab, . . . , 102am of the antenna array 102a.

The remaining antenna arrays 102b, . . . , 102n and their respective antenna elements are driven in a similar manner by corresponding RF signal control circuits 130b, . . . , 130m. This produces corresponding numbers of composite radiated signals 103a, 103b, . . . , 103n for conveyance to and reception by the antennas 202a, 202b, . . . , 202n of the DUT 200a in accordance with the channel H matrix, as discussed above. The DUT 200a processes its corresponding received test signals 211a, 211b, . . . , 211m and provides one or more feedback signals 201a indicative of the characteristics (e.g., magnitudes, relative phases, etc.) of these received signals. These feedback signals 201a are provided to control circuitry 138 within the RF signal control circuits 130. This control circuitry 138 provides control signals 137, 139a, 139b, . . . , 139m for the magnitude control circuitry 132 and phase control circuitry 136. Accordingly, a closed loop control path is provided, thereby enabling gain and phase control of the individual radiated signals from the tester 100a for reception by the DUT 200a. (Alternatively, this control circuitry 130 can be included as part of the tester 100a.)

In accordance with well-known channel optimization techniques, the control circuitry 138 uses this feedback data 201a from the DUT 200a to achieve optimal channel conditions by altering the magnitudes and phases of the radiated signals in such a manner as to minimize the channel condition number k(H), and produce received signals, as measured at each DUT antenna 202, having approximately equal magnitudes. This will create a communication channel through which the radiated signals produce test results substantially comparable to those produced using conductive signal paths (e.g., RF signal cables).

This operation by the control circuitry 138 of the RF signal control circuitry 130, following successive transmissions and channel condition feedback events, will vary the signal magnitude and phase for each antenna array 102a, 102b, . . . , 102n to iteratively achieve an optimized channel condition number k(H). Once such an optimized channel condition number k(H) has been achieved, the corresponding magnitude and phase settings can be retained and the tester 100a and DUT 200a can continue thereafter in a sequence of tests, just as would be done in a cabled testing environment.

In practice, a reference DUT can be placed in a test fixture within the shielded enclosure 300 for use in optimizing the channel conditions through the iterative process discussed above. Thereafter, further DUTs of the same design can be successively tested without having to execute channel optimization in every instance, since differences in path loss experienced in the controlled channel environment of the enclosure 300 should be well within normal testing tolerances.

Referring still to FIG. 5, for example, an initial transmission was modeled to produce a channel condition number of 13.8 dB, and the magnitudes of the $h_{11}$ and $h_{22}$ coefficients were −28 dB and −28.5 dB, respectively. The magnitude matrix for the channel H would be represented as follows:

$$HdB = \begin{bmatrix} -28 & -34.2 \\ -29.8 & -28.5 \end{bmatrix} \quad k(H) = 13.8 \text{ dB}$$

After iterative adjustments of magnitude and phase, as discussed above, the channel condition number k(H) was reduced to 2.27 dB, and the amplitudes of the $h_{11}$ and $h_{22}$ coefficients were −0.12 dB and −0.18 dB, respectively, producing a channel magnitude matrix as follows:

$$H_{dB} = \begin{bmatrix} -0.12 & -13.68 \\ -15.62 & -0.18 \end{bmatrix} \quad k(H) = 2.27 \text{ dB}$$

These results are comparable to those of a cabled testing environment, thereby indicating that such a wireless testing environment can provide test results of comparable accuracy. By eliminating time for connecting and disconnecting cabled signal paths, and factoring in the reduced time for gain and phase adjustments, the overall received signal test time is significantly reduced.

Figure 6:
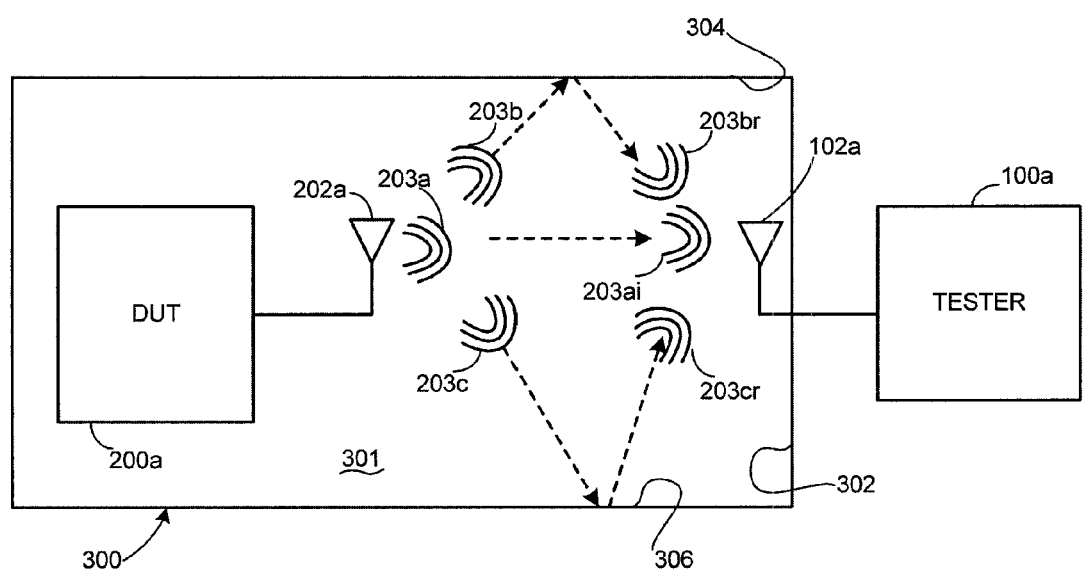
FIG. 6 depicts a testing environment in which a DUT is tested using radiated electromagnetic test signals within a shielded enclosure.

Referring to FIG. 6, influences of multipath signal effects upon the channel condition can be better understood. As discussed above, once disposed within the interior 301 of the enclosure 300, the DUT 200a, during transmit testing, radiates an electromagnetic signal 203a from each antenna 202a. This signal 203a includes components 203b, 203c that radiate outwardly and away from the antenna 102a of the tester 100a. However, these signal components 203b, 203c are reflected off of interior surfaces 304, 306 of the enclosure 300 and arrive as reflected signal components 203br, 203cr to combine, constructively or destructively, depending upon the multipath signal conditions, with the main incident signal component 203ai. As discussed above, depending upon the constructive and destructive nature of the interference, test results will generally tend to be unreliable and inaccurate for use in proper calibration and performance verification.

Figure 7:
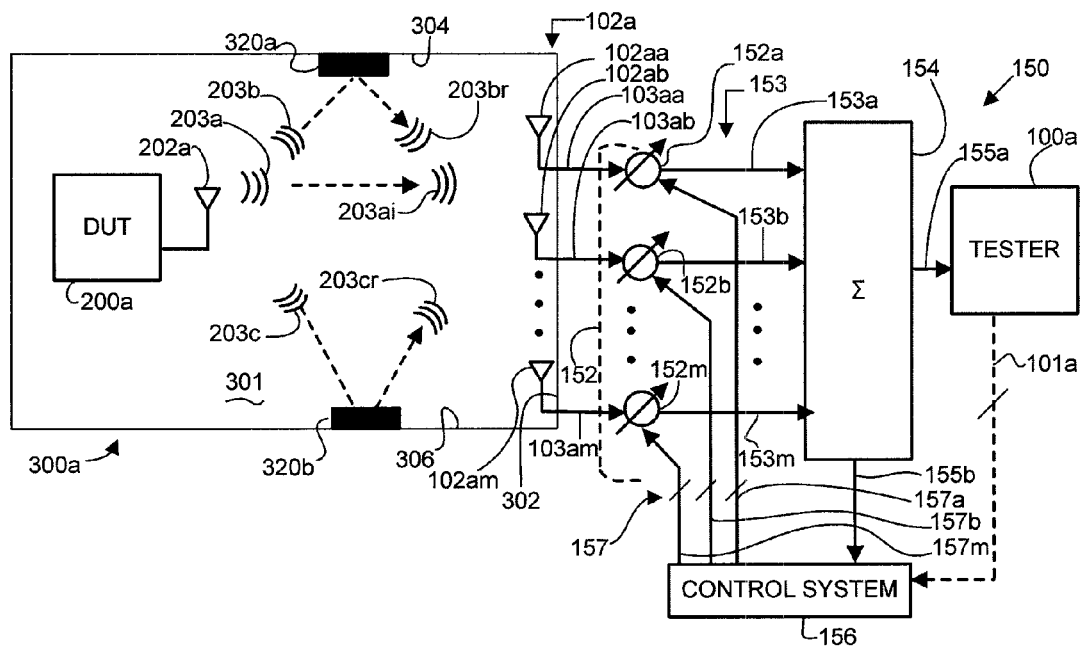
FIGS. 7 and 8 depict exemplary embodiments of testing environments in which a wireless DUT is tested using radiated electromagnetic test signals in a shielded enclosure with reduced multipath signal effects.

Referring to FIG. 7, in accordance with an exemplary embodiment, RF absorbent materials 320a, 320b are disposed at the reflective surfaces 304, 306. As a result, the reflected signal components 203br, 203cr are attenuated significantly, thereby producing less interference, either constructively or destructively, with the incident primary signal component 203ai.

Additional RF signal control circuitry 150 can be included for use between the antenna array 102a mounted within the interior 301 or on the interior surface 302 of the enclosure 300a and the tester 100a. (Alternatively, this additional control circuitry 150 can be included as part of the tester 100a.) The radiated signals impinging upon the antenna elements 102aa, 102ab, ..., 102am produce received signals 103aa, 103ab, ..., 103am with respective signal phases controlled (e.g., shifted) by phase control circuitry 152 having phase control elements 152a, 152b, ..., 152m controlled in accordance with one or more phase control signals 157a, 157b, ..., 157m provided by a control system 156. The resulting phase-controlled signals 153 are combined in a signal combiner 154 to provide the received signal 155a for the tester 100a and a feedback signal 155b for the control system 156. The control system 156 processes this feedback signal 155b, as part of a closed loop control network, to adjust, as needed, the respective phases of the composite receive signals 103aa, 103ab, ..., 103am to minimize the apparent signal path loss associated with the interior region 301 of the enclosure 300a. This closed loop control network also allows the system to reconfigure the phased array enabled by these antennas 102a and phase control circuitry 152 in the event that the positioning or orientation of the DUT 200a changes within the enclosure 300a. As a result, following minimization of the path loss using this feedback loop, accurate and repeatable conveyance of the DUT signal 203a to the tester 100a using the radiated signal environment within the enclosure 300a can be achieved.

Figure 8:
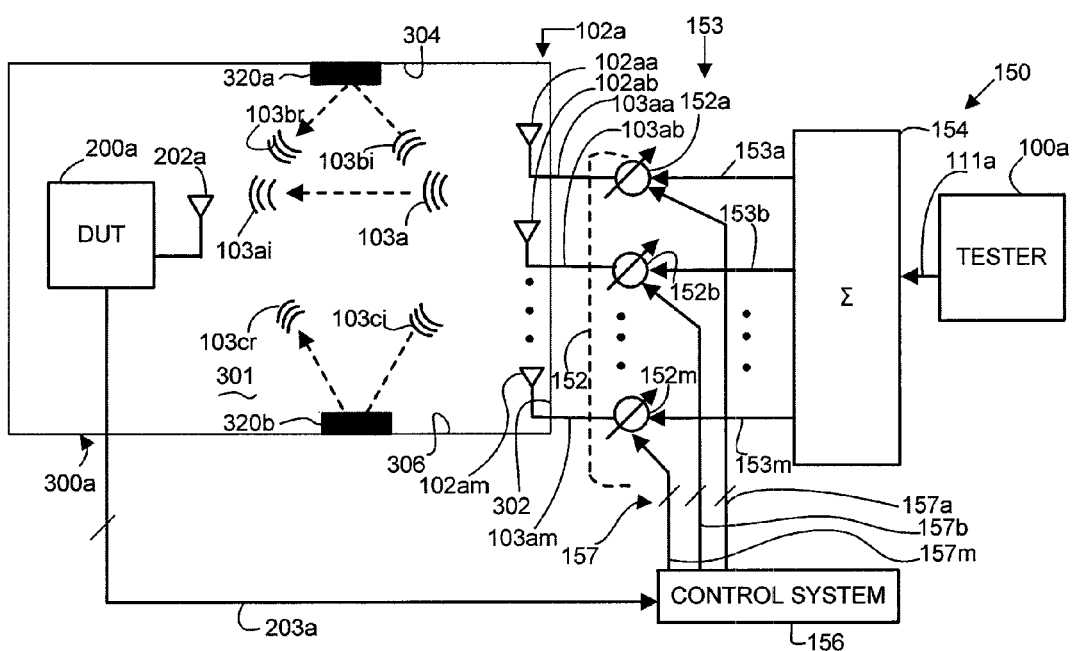

Referring to FIG. 8, similar control and improvement in producing accurate and repeatable test results can be achieved for DUT receive signal testing. In this case, the test signal 111a provided by the tester 100a is replicated by the signal combiner/splitter 154, and the respective phases of the replicated test signals 153 are adjusted as necessary by the phase control circuitry 152 before being radiated by the antenna elements 102aa, 102ab, ..., 102am. As in the previous case, the reflected signal components 103br, 103cr are significantly attenuated and result in reduced constructive and destructive interference with the primary incident signal component 103ai. One or more feedback signals 203a from the DUT 200a provide the control system 156 with the information necessary for controlling the phases of the replicated test signals 153 to minimize the apparent signal path loss associated with the interior 301 of the enclosure 300a, thereby establishing consistent and repeatable signal path loss conditions.

Figure 9:
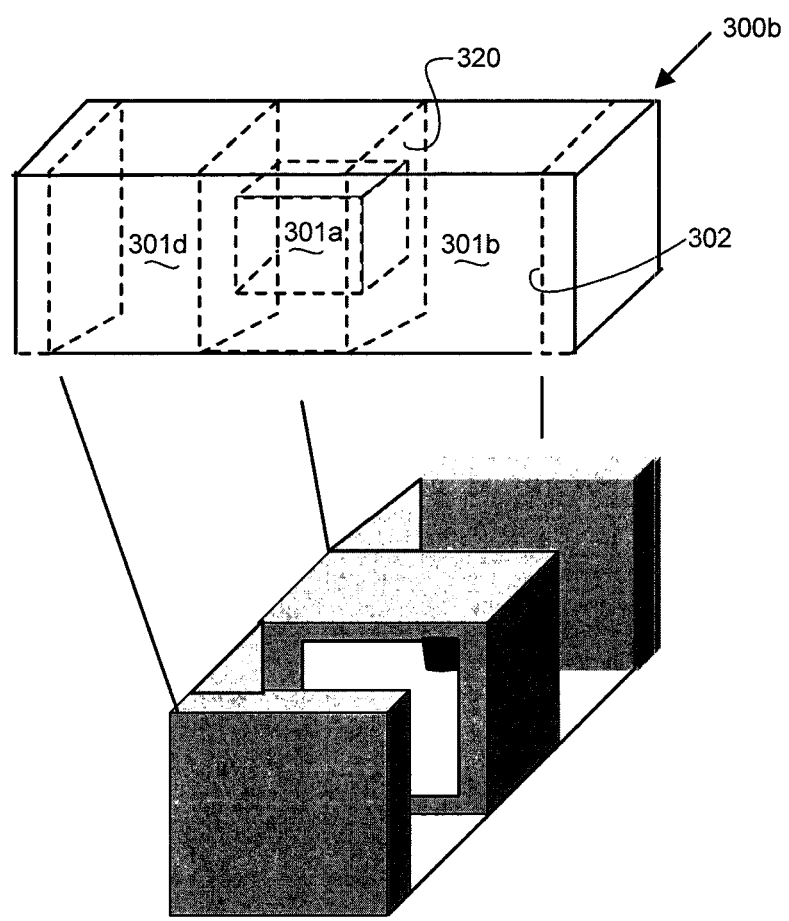
FIG. 9 depicts a physical representation of a shielded enclosure in accordance with an exemplary embodiment for use in the testing environments of FIGS. 7 and 8.

Referring to FIG. 9, in accordance with one or more exemplary embodiments, the shielded enclosure 300b can be implemented substantially as shown. As discussed above, the DUT can be positioned at one end 301d of the interior 301 of the enclosure 300b, opposite of the interior region 301b containing or facing the interior surface 302 on which the tester antenna arrays 102a, 102b, ..., 102n (FIG. 5) are located. In between is an interior region 301a forming a waveguide cavity surrounded by the RF absorbent materials 320.

As discussed above and in more detail below, exemplary embodiments of systems and methods enable cable-free testing of wireless DUTs while compensating for multipath effects and optimizing control of signal path losses. Multiple antennas, as well as antenna arrays, used in conjunction with control systems allow for adjustment of the phases of the test signals provided to the antenna elements in such a manner as to emulate the stable and repeatable signal path loss environment normally associated with a conductive signal path environment, while using a radiated signal environment within a shielded enclosure. While the time needed for adjusting the phase shifters is part of the overall test time, such adjustment time is significantly less than that needed for connecting and disconnecting test cables and provides the added benefit of real world testing that includes the antenna elements.

Further, as discussed in more detail below, exemplary embodiments provide for cable-free testing of wireless DUTs while achieving testing accuracies and repeatable measurements commensurate with testing using conductive signal paths, e.g., test cables, for signals having a wide bandwidth, such as the 160 megahertz (MHz) wide signal as prescribed by the Institute of Electrical and Electronic Engineers (IEEE) standard 802.11ac. By adjusting the phases of the test signals provided to the antenna elements, a substantially flat signal response can be created for the wideband signal being received within the shielded test enclosure. Once the individual test signal phases driving the individual antenna elements have been adjusted to create such a flat signal response environment, the testing using the wideband signal may proceed without further adjustment, just as though it were in a cabled test environment. While positioning of the DUT within the shielded enclosure can affect the flatness of the channel response, such positioning sensitivity has been found to be well within the tolerance of measurements prescribed by underlying signal standards (e.g., IEEE 802.11ac).

Further still, in accordance with exemplary embodiments, such cable-free testing can be performed upon multiple DUTs simultaneously within the same shielded enclosure. With appropriate control and adjustments of the phases and magnitudes of the test signals driving the multiple antenna elements, the low crosstalk signal environment of conductive signal paths can be emulated using a radiated test signal environment within a shielded enclosure. Once the phases and gains (or attenuations) of the test signals driving the antenna elements have been adjusted in accordance with the exemplary embodiments, the signals received at the antennas of the multiple DUTs will be commensurate with signals received using cabled signal paths. For example, this can be achieved by maximizing the direct-coupled coefficients while minimizing the cross-coupled coefficients of the channel matrix (e.g., producing differences of at least 10 decibels between the direct- and cross-coupled coefficients).

Figure 10:
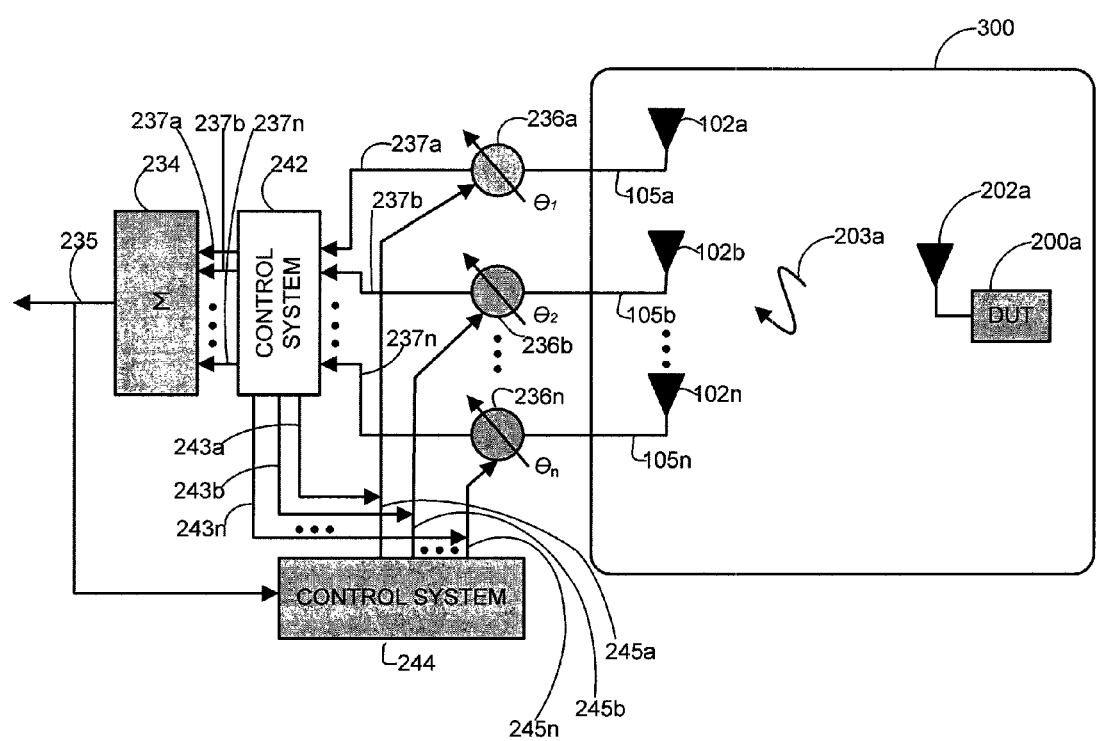
FIG. 10 depicts a testing environment in accordance with exemplary embodiments in which a DUT can be tested using radiated electromagnetic test signals.

Referring to FIG. 10, in accordance with exemplary embodiments, a DUT 200a is positioned within the shielded enclosure 300 for transmit signal testing. The DUT test signal 203a, transmitted via its antenna 202a, is received by the multiple antenna elements 102a, 102b, ..., 102n. The resulting received signals 105a, 105b, ..., 105n have their respective signal phases controlled and adjusted by respective phase control circuits 236a, 236b, ..., 236n.

In accordance with some exemplary embodiments, the resulting phase-controlled test signals 237a, 237b, ..., 237n are conveyed to a control system 242 (discussed in more detail below) and signal combining circuitry 234. The control system 242 provides phase control signals 243a, 243b, ..., 243n for the phase control circuits 236a, 236b, ..., 236n. The combined (e.g., summed) phase-controlled test signals 237a, 237b, ..., 237n produce a composite test signal 235 for downstream analysis, e.g., by a VSA (not shown).

In accordance with other embodiments, the phase-controlled test signals 237a, 237b, . . . , 237n are combined in the signal combiner 234 to produce the composite test signal 235. The composite test signal 235 is conveyed to an alternative control system 244 (discussed in more detail below), which, in turn, provides the phase control signals 245a, 245b, . . . , 245n for the phase control circuits 236a, 236b, . . . , 236n.

Figure 11:
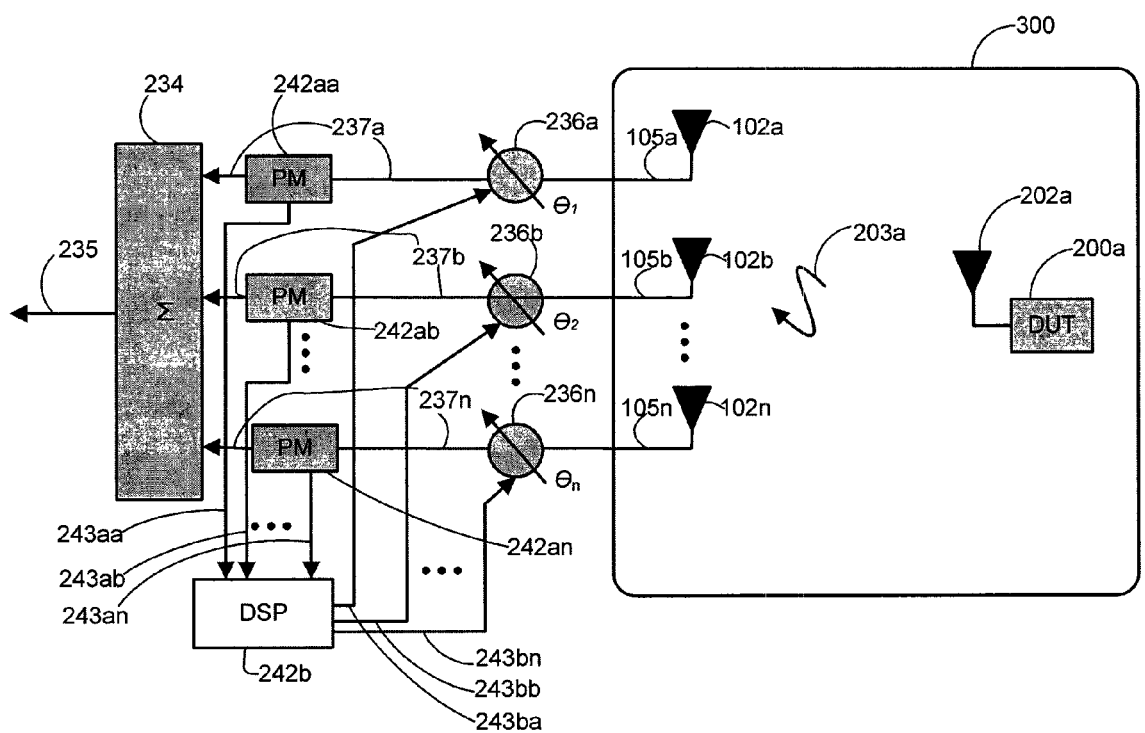
FIG. 11 depicts another testing environment in accordance with exemplary embodiments in which a DUT can be tested using radiated electromagnetic test signals.

Referring to FIG. 11, in accordance with one exemplary embodiment, the in-line control system 242 includes power measurement circuits 242aa, 242ab, . . . , 242an for measuring respective power levels of the phase-controlled test signals 237a, 237b, . . . , 237n. The resulting power measurement signals 243aa, 243ab, . . . , 243an, indicative of the respective test signal power levels, are provided to control circuitry 242b, e.g., in the form of a digital signal processor (DSP), which, in turn, provides appropriate phase control signals 243ba, 243bb, . . . , 243bn for the phase control circuits 236a, 236b, . . . , 236n.

Figure 12:
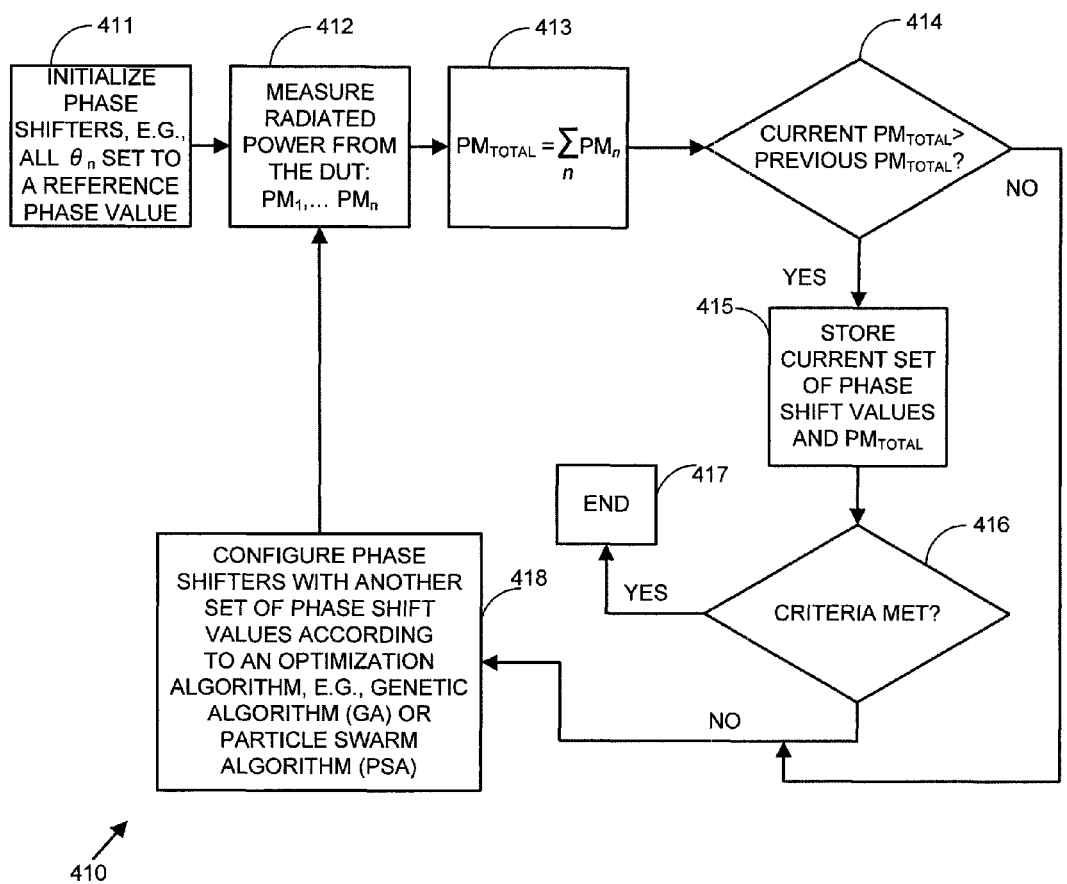
FIG. 12 depicts an exemplary algorithm for testing a DUT using the testing environment of FIG. 11.

Referring to FIG. 12, in accordance with an exemplary embodiment, operation 410 of the testing environment of FIG. 11 can proceed as shown. First, the phase shifters 236a, 236b, . . . , 236n are initialized 411, e.g. where all phase shift values are set to a common reference phase value or individual reference phase values. Next, the power levels of the phase-controlled signals, 237a, 237b, . . . , 237n are measured 412. Next, the measured power values are summed 413 and the cumulative measured signal power is compared 414 to a previous cumulative measured signal power. If the current cumulative measured power is greater than the previous cumulative measured power, the current phase shift values and cumulative measured power are stored 415, following which, these stored values are compared 416 against the desired criteria (e.g., a maximized cumulative measured power). If such criteria are met, adjustments of the test signal phases are terminated 417. If not, adjustments of the test signal phases continue.

Similarly, if the current cumulative measured power is not greater than the previous cumulative measured power 414, adjustments of the test signal continue. Accordingly, the phase shifters 236a, 236b, . . . , 236n are adjusted 418 to impart another combination or permutation of phase shift values upon the received test signals 105a, 105b, . . . , 105n, e.g., in accordance with a genetic algorithm (GA) or a particle swarm algorithm (PSA). Following this, the measuring 412, summing 413 and comparing 414 of powers are repeated until the desired criteria have been met.

Figure 13:
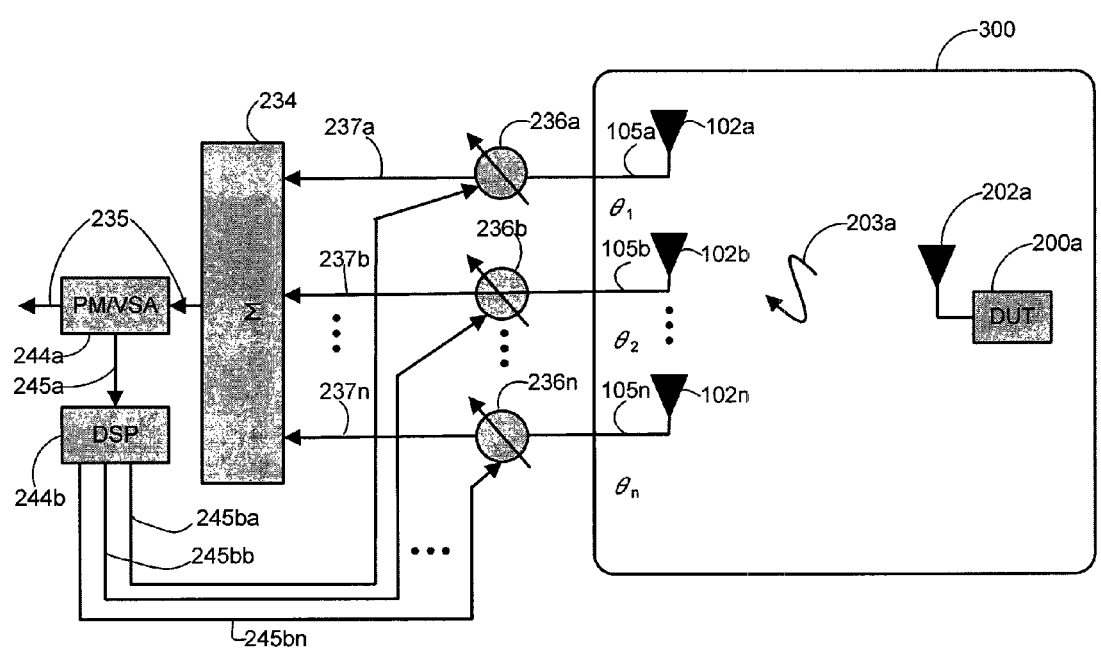
FIG. 13 depicts another testing environment in accordance with exemplary embodiments in which a DUT can be tested using radiated electromagnetic test signals.

Referring to FIG. 13, in accordance with another exemplary embodiment, the alternative downstream control system 244 (FIG. 10) includes power measurement circuitry 244a (e.g., a VSA) and control circuitry 244b (e.g., a DSP). A power level of the composite signal 235 is measured by the power measurement circuitry 244a, which provides power measurement data 245a to the control circuitry 244b. In turn, the control circuitry 244b provides appropriate phase control signals 245ba, 245bb, . . . , 245bn to the phase shifters 236a, 236b, . . . , 236n.

Figure 14:
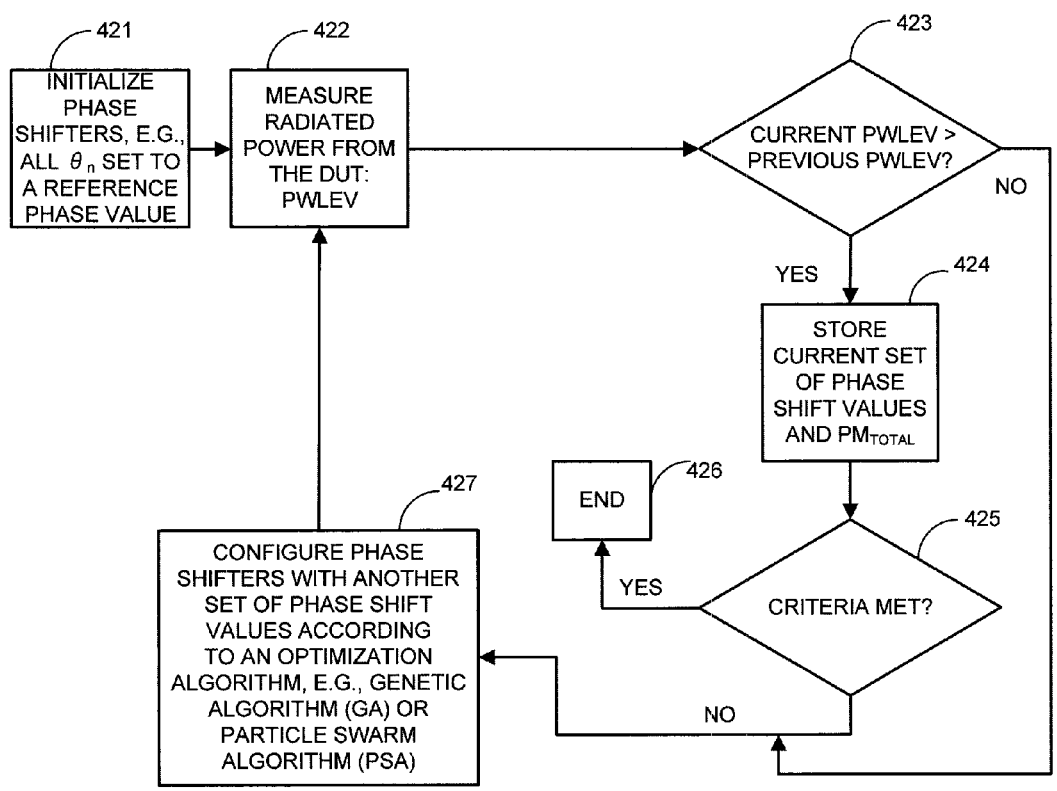
FIG. 14 depicts an exemplary algorithm for testing a DUT using the testing environment of FIG. 13.

Referring to FIG. 14, operation 420 of the testing environment of FIG. 13 can proceed as shown. First, the phase shifters 236a, 236b, . . . , 236n are initialized 421, by being preset to one or more respective phase shift values. Next, the power level of the composite signal 235 is measured 422, following which, the current measured power is compared 423 to a previous measured power level. If the current measured power level is greater than the previous measured power level, the current phase shift values and measured power are stored 424 and used for determining 425 whether the desired criteria (e.g., a maximized measured power level) have been met. If so, phase adjustments are terminated 426. If not, phase adjustments continue.

Similarly, if the current measured power is not greater than the previous measured power, phase adjustments continue. Accordingly, the phase shifters 236a, 236b, . . . , 236n are adjusted to impart another set of phase shift values upon the received test signals 105a, 105b, . . . , 105n in accordance with an optimization algorithm (e.g., a GA or PSA).

Figure 15:
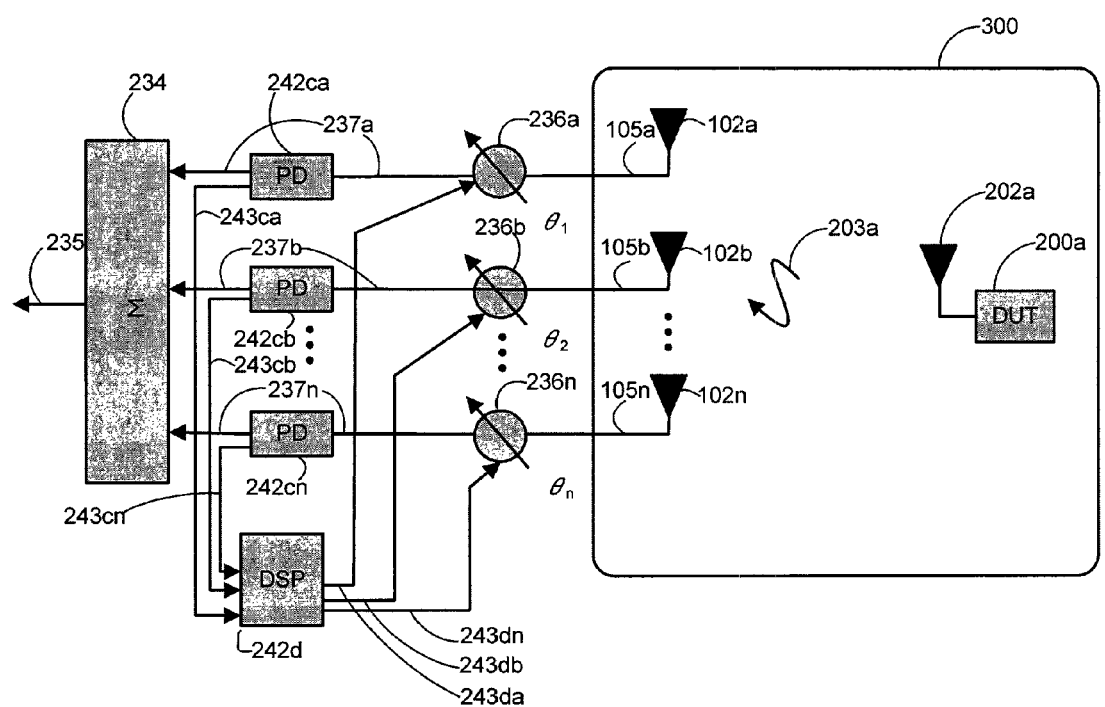
FIG. 15 depicts another testing environment in accordance with exemplary embodiments in which a DUT can be tested using radiated electromagnetic test signals.

Referring to FIG. 15, in accordance with another exemplary embodiment, the in-line control system 242 (FIG. 10) includes phase detection circuits 242ca, 242cb, . . . , 242cn and control circuitry 242d (e.g., a DSP). The phase detectors 242ca, 242cb, . . . , 242cn detect the respective signal phases of the phase-controlled signals 237a, 237b, . . . , 237n, and provide corresponding phase data 243ca, 243cb, . . . , 243cn to the control circuitry 242d. Based upon this data, the control circuitry 242d provides appropriate phase control signals 243da, 243db, . . . , 243dn for the phase shifters 236a, 236b, . . . , 236n.

Figure 16:
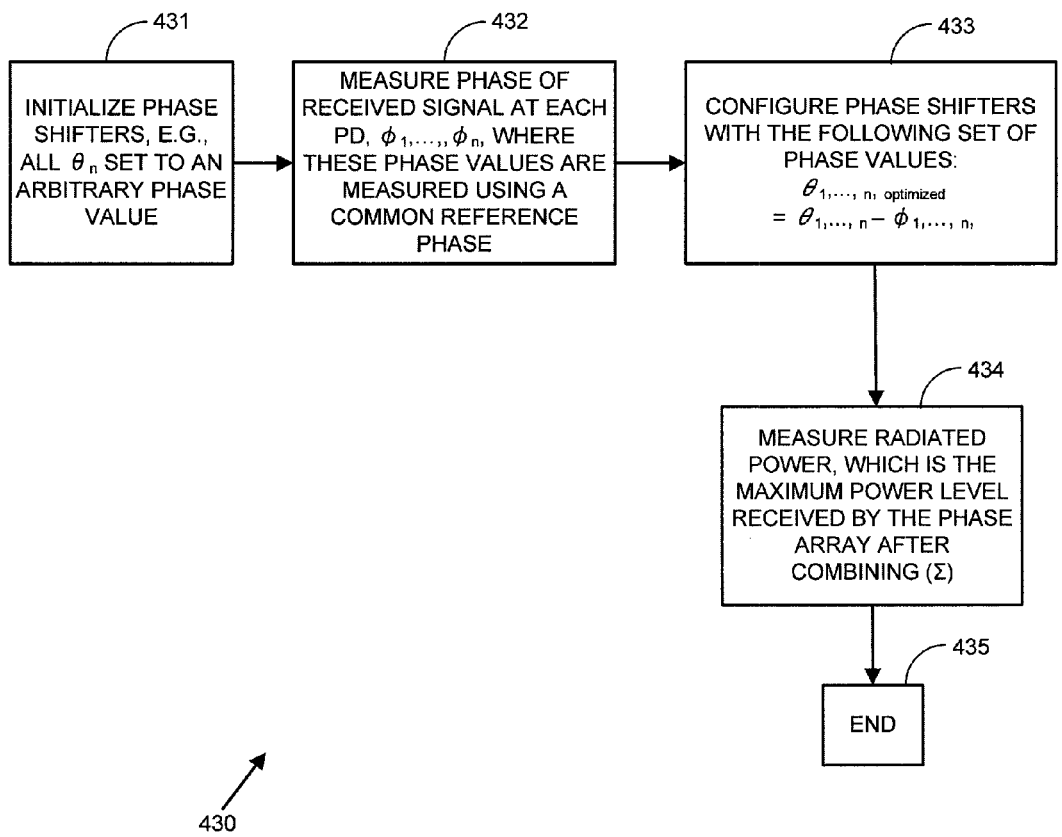
FIG. 16 depicts an exemplary algorithm for testing a DUT using the testing environment of FIG. 15.

Referring to FIG. 16, operation 430 of the testing environment of FIG. 15 can proceed as shown. First, the phase shifters 236a, 236b . . . , 236n are initialized 431 by being present to one or more respective phase shift values. Next, the respective phases of the phase-controlled signals 237a, 237b, . . . 237n are measured 432 (e.g., relative to a common or reference signal phase).

Next, based upon the measured test signal phases, the phase adjustments of the phase shifters 236a, 236b . . . , 236n are configured 433 in accordance with optimized phase shift values. Following this, the power level of the composite signal 235 is measured 434 to confirm its attainment of the desired composite signal power level, following which phase adjustments are terminated 435.

Figure 17:
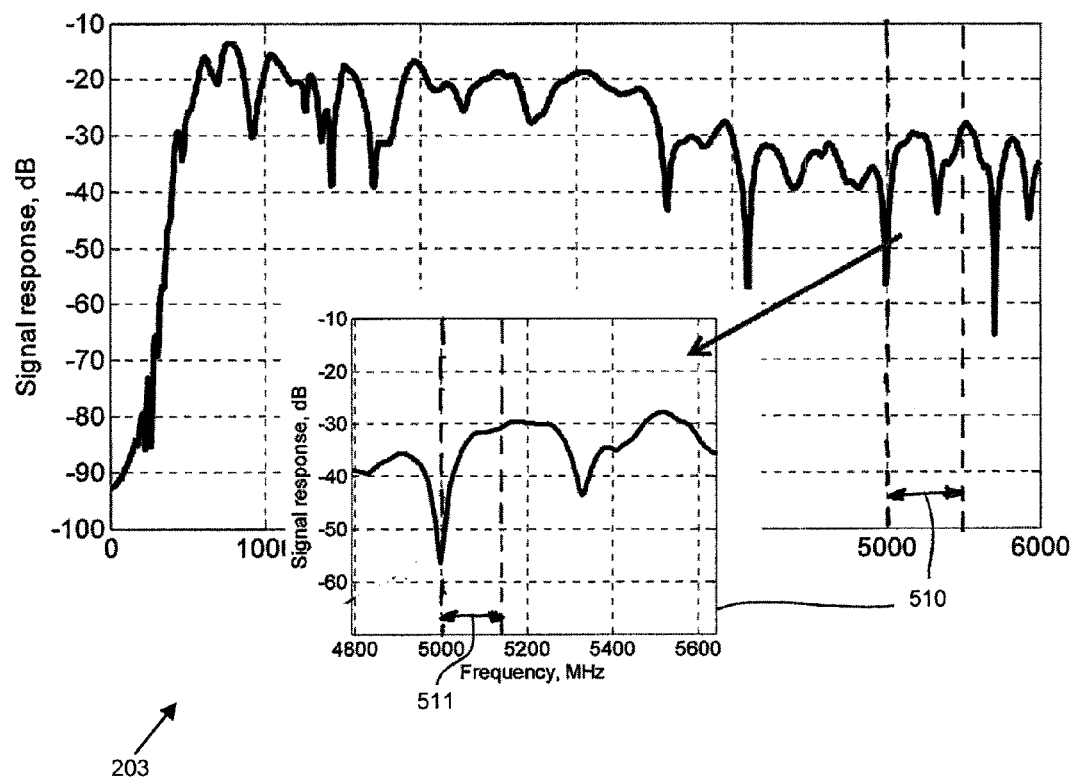
FIG. 17 depicts a test signal transmitted by a DUT over a defined frequency range prior to compensation in accordance with exemplary embodiments.

Referring the FIG. 17, an exemplary received signal 203 radiated from a DUT 200a with constant power from a wideband antenna 202a with good response for frequencies ranging from 700 through 6000 MHz within a shielded enclosure 300 (e.g., FIG. 6) would appear substantially as shown. As will be readily appreciated, its power profile will not be flat due to the rich multipath signal environment existing within the shielded enclosure 300. In the case of a packet data signal communicated in accordance with IEEE standard 802.11ac, of particular interest is the 160 MHz wide frequency band from 5000 through 5160 MHz. As can be seen, within this frequency band 511, as seen in the expanded portion 510 of the signal 203 profile, the received signal displays a power variation of approximately 25 decibels (dB). In accordance with exemplary embodiments, using testing environments such as those discussed above, with multiple phase shifters for controlling the phases of the test signals driving the multiple antenna elements, this profile can be compensated so as to become substantially flat over the frequency band 511 of interest.

Figure 18:
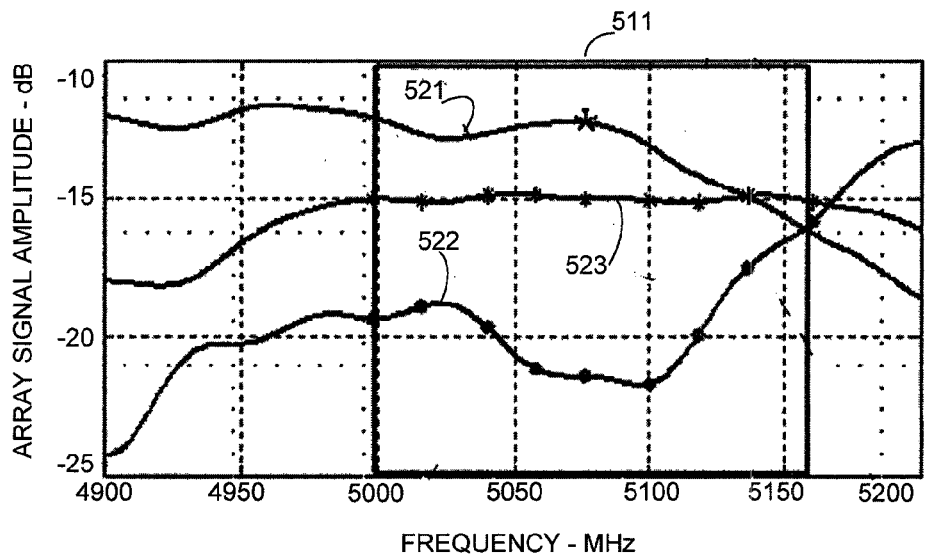
FIG. 18 depicts the swept test signal of FIG. 17 prior to and following compensation in accordance with exemplary embodiments, along with exemplary phase shift values for the testing environments of FIGS. 10, 11, 13 and 15.
Figure 18:
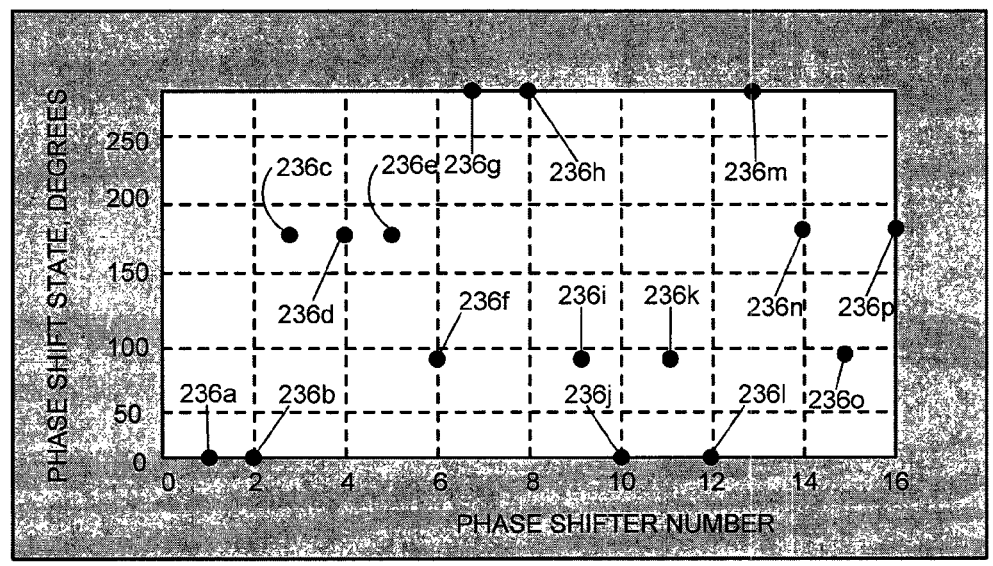

Referring to FIG. 18, in accordance with one exemplary embodiment, this can be achieved using multiple (e.g., 16) antenna elements 102 and corresponding phase shifters 236. For example, using an optimization algorithm (discussed in more detail below), and using only quadrature phase adjustments of 0, 90, 180 and 270 degrees, it is possible to achieve an optimally flat response condition 523. As can be seen, prior to compensation, the response profile 522 varies more than 5 dB over the 160 MHz bandwidth 511 of this exemplary test signal. Further, even when the antenna array is optimized for power level at the frequency midpoint of 5080 MHz, as shown in the upper profile 521, received signal variation is still approximately 5 dB. But when the multiple phase adjusters 236a, 236b, . . . , 236p are appropriately adjusted, even though confined to quadrature phase adjustments only, it is possible to achieve a response profile 523 that varies no more than 0.5 dB.

Figure 19:
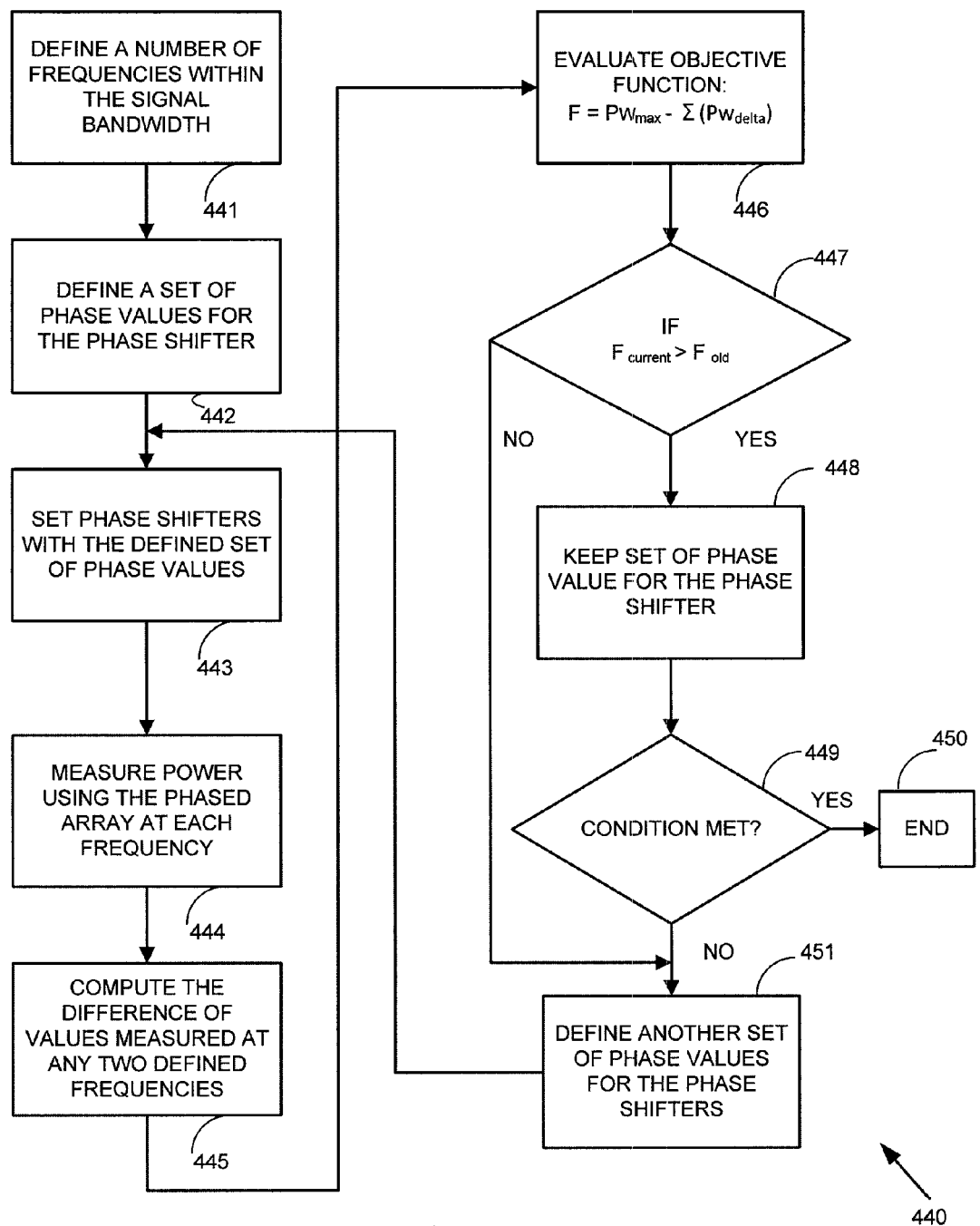
FIG. 19 depicts an exemplary algorithm for performing compensation as depicted in FIG. 18.

Referring to FIG. 19, the compensation has depicted in FIG. 18 can be achieved using a process 440 as shown. First, a number of frequencies within the desired signal bandwidth are defined 441, following which an initial set of phase shift values for the phase shifters is defined 442. The phase shifters are then set 443 with such defined phase values and the power is measured 444 at each frequency. Next, differences between measured powers at multiple pairs of the defined frequencies are computed 445 and summed for evaluation of 446 a function F equal to a difference between a defined maximum power difference and the summed differences of computed powers.

If the current computed function $F_{current}$ is greater than a former computed function $F_{old}$, then the phase shifter values are retained 448 and it is determined 449 whether a desired condition has been met (e.g., a maximized computed function F has been attained). If so, phase adjustments are terminated 450. If not, phase adjustments continue. Similarly, if the current computed function $F_{current}$ is not greater than a former computed function $F_{old}$, phase adjustments continue. These phase adjustments continue by defining another set of phase shifter values 451 and repeating the steps of adjusting the phases 443, measuring power 444, computing power differences 445 and evaluating the computed function F 446. This process is repeated until the condition has been met 449.

Figure 20:
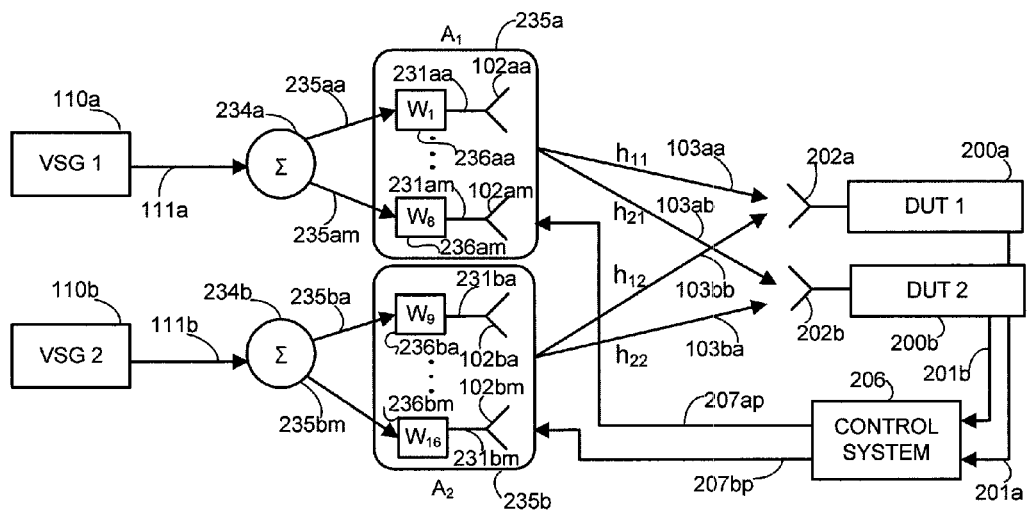
FIG. 20 depicts another testing environment for testing a wireless DUT with compensation using multiple test signal phase shifts in accordance with exemplary embodiments.
Figure 20:
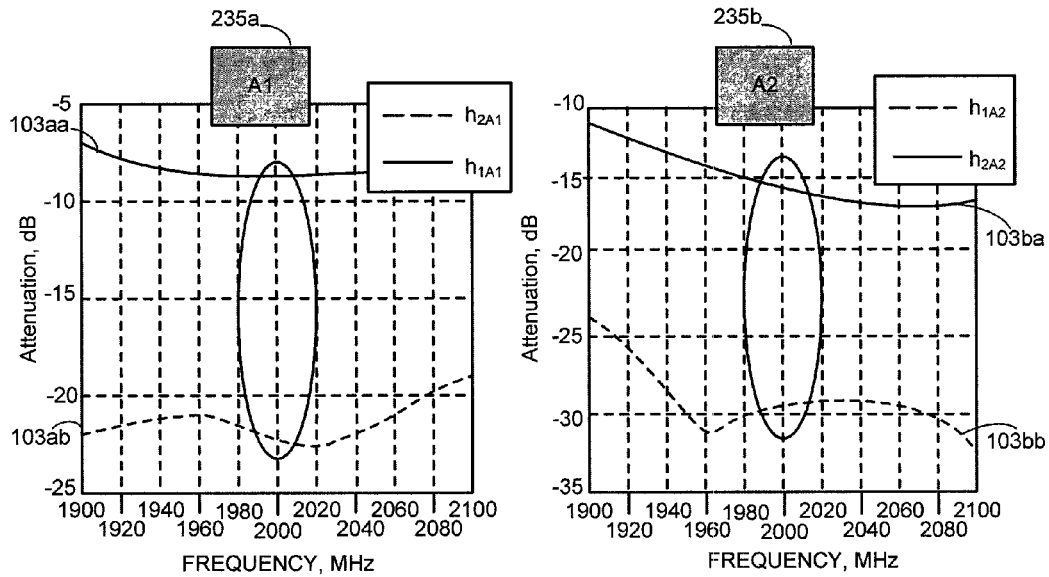

Referring to FIG. 20, in accordance with exemplary embodiments, similar compensation can be achieved in the context of cross-coupled signals within a shielded enclosure 300 when performing cable-free testing of multiple wireless DUTs. (For purposes of this example, two DUTs 200a, 200b are to be tested using two antenna arrays 235a, 235b. However, it will be readily appreciated that other numbers of DUTs and antenna arrays can be used as well. Further, it will be readily appreciated that what are depicted here as separate "DUTs" 200a, 200b may be respective receivers within a single MIMO DUT 200.) As discussed above, signal sources (e.g., VSGs) 110 provide test signals 111 which are replicated using signal splitters 234 to provide replica test signals 235 for phase shifting using multiple phase shifters 231 for driving the antenna elements 102 of the antenna arrays 235. These antenna arrays 235a, 235b provide radiated signal components 103aa, 103ab, 103ba, 103bb corresponding to the direct-coupled and cross-coupled coefficients of the channel matrix H (e.g., as discussed above). These signal components 103aa, 103ab, 103ba, 103bb are received by the antennas 202a, 202b of the DUTs 200a, 200b. Received signal data 201a, 201b are provided by the DUTs 200a, 200b to a control system 206 (e.g., a DSP), which, in turn, provides appropriate phase control signals 207ap, 207bp for the phase shifters 236aa, . . . , 236am, 236ba, . . . , 236bm for controlling the phases of the signals to be radiated from the antenna elements 102aa, . . . , 102am, 102ba, . . . 102bm of the antenna arrays 235a, 235b.

By iteratively adjusting the phases of the radiated signals, as discussed above, the direct-coupled channel matrix H coefficients 103aa, 103ba can be maximized and the cross-coupled coefficients 103ab, 103bb minimized (e.g., with the final cross-coupled coefficients ideally becoming more than 10 dB less than the direct-coupled coefficients).

Figure 21:
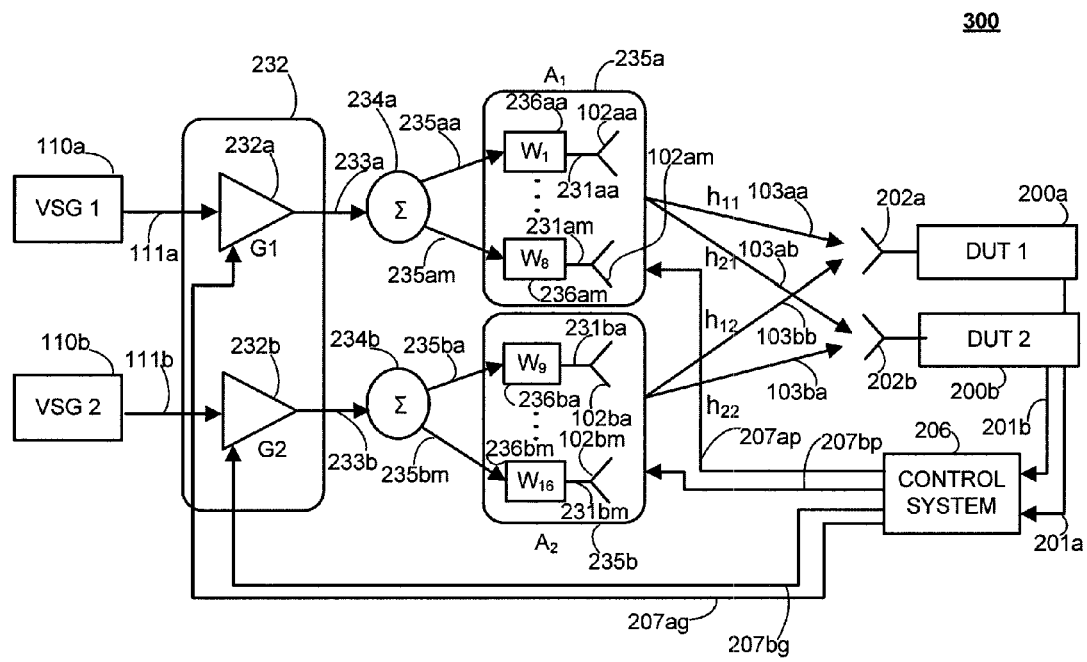
FIG. 21 depicts the testing environment of FIG. 20 with the addition of test signal gain adjustments for compensating in accordance with additional exemplary embodiments.

Referring to FIG. 21, in accordance with another exemplary embodiment, the control system 206 can be further configured to provide gain control signals 207ag, 207bg for controlling the magnitudes of the test signals 111a, 111b being replicated for transmission to the DUTs 200a, 200b. These signal magnitudes can be controlled by controlling signal gain stages (e.g., variable gain amplifiers or signal attenuators) 232a, 232b. This can beneficially provide for further optimizing the relative magnitudes of the direct-coupled coefficients 103aa, 103ba and cross-coupled coefficients 103ab, 103bb of the channel matrix H. For example, the magnitudes of the direct-coupled coefficients 103aa, 103ba can be normalized, while still maintaining sufficient attenuation of the cross-coupled coefficients 103ab, 103bb (e.g., 10 dB or more).

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system to facilitate wireless testing of a radio frequency (RF) signal transceiver device under test (DUT), comprising:
   a structure defining interior and exterior regions and configured to allow placement of a DUT within said interior region and to be substantially isolated from electromagnetic radiation originating from said exterior region;
   a plurality of antennas disposed at least partially within said interior region to receive at least one plurality of wireless RF test signals related to a common RF test signal radiated from said DUT, and to transmit another plurality of wireless RF test signals to said DUT, wherein said received and transmitted RF test signals are received and transmitted via common ones of said plurality of antennas; and
   RF signal control circuitry coupled to said plurality of antennas and responsive to said at least one plurality of wireless RF test signals by
      controlling, in accordance with one or more phase control signals, respective phases of at least a portion of said at least one plurality of wireless RF test signals to provide at least one plurality of phase-controlled RF test signals,
      measuring and combining said at least one plurality of phase-controlled RF test signals to provide said one or more phase control signals and a RF output signal related to a combination of said at least one plurality of phase-controlled RF test signals, and
      repeating said controlling and said measuring and combining until a maximized signal power is attained for at least one of
         a cumulative power of said at least one plurality of phase-controlled RF test signals, and
         said RF output signal;
   wherein said RF signal control circuitry provides said RF output signal via a conductive signal path for direct reception therefrom by a tester, and said interior region contains the only over-the-air (OTA) signal environment between said DUT and said tester.

2. The apparatus of claim 1, wherein said RF signal control circuitry comprises:

phase control circuitry coupled to said plurality of antennas and responsive to said at least one plurality of wireless RF test signals and said one or more phase control signals by providing said at least one plurality of phase-controlled RF test signals;

control signal circuitry coupled to said phase control circuitry and responsive to said at least one plurality of phase-controlled RF test signals by providing said one or more phase control signals; and combining circuitry coupled to at least one of said phase control circuitry and said control signal circuitry, and responsive to said at least one plurality of phase-controlled RF test signals by providing said RF output signal.

3. The apparatus of claim 2, wherein said control signal circuitry comprises power detection circuitry.

4. The apparatus of claim 2, wherein said control signal circuitry comprises:
power measurement circuitry responsive to said at least one plurality of phase-controlled RF test signals by providing a plurality of power signals indicative of respective power levels of each of said at least one plurality of phase-controlled RF test signals; and processing circuitry coupled to said power measurement circuitry and responsive to said plurality of power signals by providing said one or more phase control signals.

5. The apparatus of claim 2, wherein said control signal circuitry comprises phase detection circuitry.

6. The apparatus of claim 2, wherein said control signal circuitry comprises:
phase measurement circuitry responsive to said at least one plurality of phase-controlled RF test signals by providing a plurality of phase signals indicative of respective signal phases of each of said at least one plurality of phase-controlled RF test signals; and processing circuitry coupled to said phase measurement circuitry and responsive to said plurality of phase signals by providing said one or more phase control signals.

7. The apparatus of claim 1, wherein said RF signal control circuitry comprises:
phase control circuitry coupled to said plurality of antennas and responsive to said at least one plurality of wireless RF test signals and said one or more phase control signals by providing said at least one plurality of phase-controlled RF test signals;

combining circuitry coupled to said phase control circuitry and responsive to said at least one plurality of phase-controlled RF test signals by providing said RF output signal; and control signal circuitry coupled to said combining circuitry and said phase control circuitry, and responsive to said RF output signal by providing said one or more phase control signals.

8. The apparatus of claim 7, wherein said control signal circuitry comprises power detection circuitry.

9. The apparatus of claim 7, wherein said control signal circuitry comprises:
power measurement circuitry responsive to said RF output signal by providing a power signal indicative of a power level of said RF output signal; and processing circuitry coupled to said power measurement circuitry and responsive to said power signal by providing said one or more phase control signals.

10. A method of facilitating wireless testing of a radio frequency (RF) signal transceiver device under test (DUT), comprising:
providing a structure defining interior and exterior regions and configured to allow placement of a DUT within said interior region and to be substantially isolated from electromagnetic radiation originating from said exterior region;

providing a plurality of antennas disposed at least partially within said interior region to receive at least one plurality of wireless RF test signals related to a common RF test signal radiated from said DUT, and to transmit another plurality of wireless RF test signals to said DUT, wherein said received and transmitted RF test signals are received and transmitted via common ones of said plurality of antennas; and responding to said at least one plurality of wireless RF test signals by
controlling, in accordance with one or more phase control signals, respective phases of at least a portion of said at least one plurality of wireless RF test signals to provide at least one plurality of phase-controlled RF test signals, measuring and combining said at least one plurality of phase-controlled RF test signals to provide said one or more phase control signals and a RF output signal related to a combination of said at least one plurality of phase-controlled RF test signals, and repeating said controlling and said measuring and combining until a maximized signal power is attained for at least one of
a cumulative power of said at least one plurality of phase-controlled RF test signals, and
said RF output signal;

wherein said RF output signal is provided via a conductive signal path for direct reception therefrom by a tester, and said interior region contains the only over-the-air (OTA) signal environment between said DUT and said tester.

11. The apparatus of claim 10, wherein:
said controlling comprises responding to said at least one plurality of wireless RF test signals and said one or more phase control signals by providing said at least one plurality of phase-controlled RF test signals; and said measuring and combining comprises
measuring said at least one plurality of phase-controlled RF test signals to provide said one or more phase control signals, and
combining said at least one plurality of phase-controlled RF test signals to provide said RF output signal.

12. The apparatus of claim 11, wherein said measuring said at least one plurality of phase-controlled RF test signals comprises detecting at least one power of said at least one plurality of phase-controlled RF test signals.

13. The apparatus of claim 11, wherein said measuring said at least one plurality of phase-controlled RF test signals comprises:
detecting at least one power of said at least one plurality of phase-controlled RF test signals to provide a plurality of power signals indicative of respective power levels of each of said at least one plurality of phase-controlled RF test signals; and processing said plurality of power signals to provide said one or more phase control signals.

14. The apparatus of claim 11, wherein said measuring said at least one plurality of phase-controlled RF test signals comprises detecting at least one phase of said at least one plurality of phase-controlled RF test signals.

15. The apparatus of claim 11, wherein said measuring said at least one plurality of phase-controlled RF test signals comprises:
   detecting at least one phase of said at least one plurality of phase-controlled RF test signals to provide a plurality of phase signals indicative of respective signal phases of each of said at least one plurality of phase-controlled RF test signals; and
   processing said plurality of phase signals to provide said one or more phase control signals.

16. The apparatus of claim 10, wherein:
   said controlling comprises responding to said at least one plurality of wireless RF test signals and said one or more phase control signals by providing said at least one plurality of phase-controlled RF test signals; and
   said measuring and combining comprises
   combining said at least one plurality of phase-controlled RF test signals to provide said RF output signal, and
   measuring said RF output signal to provide said one or more phase control signals.

17. The apparatus of claim 16, wherein said measuring said RF output signal to provide said one or more phase control signals comprises detecting a power of said RF output signal.

18. The apparatus of claim 16, wherein said measuring said RF output signal to provide said one or more phase control signals comprises:
   detecting a power of said RF output signal to provide a power signal indicative of a power level of said RF output signal; and
   processing said power signal to provide said one or more phase control signals.

* * * * *